US008854457B2

(12) United States Patent
De Vleeschouwer et al.

(10) Patent No.: US 8,854,457 B2
(45) Date of Patent: Oct. 7, 2014

(54) SYSTEMS AND METHODS FOR THE AUTONOMOUS PRODUCTION OF VIDEOS FROM MULTI-SENSORED DATA

(75) Inventors: Christophe De Vleeschouwer, Vedrin (BE); Fan Chen, Ishikawa (JP)

(73) Assignee: Universite Catholique de Louvain, Louvain-la-Neuve (BE)

( * ) Notice: Subject to any disclaimer, the term of this patent is extended or adjusted under 35 U.S.C. 154(b) by 0 days.

(21) Appl. No.: 13/319,202

(22) PCT Filed: May 7, 2010

(86) PCT No.: PCT/BE2010/000039
§ 371 (c)(1),
(2), (4) Date: Nov. 7, 2011

(87) PCT Pub. No.: WO2010/127418
PCT Pub. Date: Nov. 11, 2010

(65) Prior Publication Data
US 2012/0057852 A1  Mar. 8, 2012

(30) Foreign Application Priority Data

May 7, 2009 (GB) .................................. 0907870.0

(51) Int. Cl.
| | |
|---|---|
| *H04N 5/93* | (2006.01) |
| *G11B 27/00* | (2006.01) |
| *H04N 7/18* | (2006.01) |
| *H04N 5/268* | (2006.01) |
| *G11B 27/034* | (2006.01) |
| *G11B 27/10* | (2006.01) |
| *H04N 5/262* | (2006.01) |

(52) U.S. Cl.
CPC .............. *H04N 5/262* (2013.01); *H04N 5/268* (2013.01); *G11B 27/034* (2013.01); *G11B 27/105* (2013.01)
USPC ........................... 348/135; 348/139; 386/278

(58) Field of Classification Search
CPC ....... H04N 5/76; H04N 7/181; H04N 7/0137; G11B 27/031; G11B 27/02; G01B 11/022; G01B 11/024
USPC ..................................................... 348/135–169
See application file for complete search history.

(56) References Cited

U.S. PATENT DOCUMENTS

| | | | |
|---|---|---|---|
| 5,745,126 A | 4/1998 | Jain et al. | |
| 5,969,755 A * | 10/1999 | Courtney | ...................... 348/143 |
| 7,162,055 B2 * | 1/2007 | Gu et al. | ....................... 382/103 |
| 2004/0105004 A1 | 6/2004 | Rui et al. | |
| 2005/0069207 A1 * | 3/2005 | Zakrzewski et al. | .......... 382/190 |

(Continued)

FOREIGN PATENT DOCUMENTS

| | | |
|---|---|---|
| EP | 1206129 | 5/2002 |
| EP | 1798691 | 6/2007 |

(Continued)

OTHER PUBLICATIONS

Notification of Transmittal of the International Preliminary Report on Patentability (IPRP) for PCT/BE2010/000039, dated Jul. 12, 2011.

(Continued)

*Primary Examiner* — Gelek W Topgyal
(74) *Attorney, Agent, or Firm* — Bacon & Thomas, PLLC

(57) ABSTRACT

An autonomous computer based method and system is described for personalized production of videos such as team sport videos such as basketball videos from multi-sensored data under limited display resolution. Embodiments of the present invention relate to the selection of a view to display from among the multiple video streams captured by the camera network. Technical solutions are provided to provide perceptual comfort as well as an efficient integration of contextual information, which is implemented, for example, by smoothing generated viewpoint/camera sequences to alleviate flickering visual artifacts and discontinuous story-telling artifacts. A design and implementation of the viewpoint selection process is disclosed that has been verified by experiments, which shows that the method and system of the present invention efficiently distribute the processing load across cameras, and effectively selects viewpoints that cover the team action at hand while avoiding major perceptual artifacts.

21 Claims, 15 Drawing Sheets

(56) References Cited

U.S. PATENT DOCUMENTS

2005/0128291 A1* 6/2005 Murakami ............... 348/143
2008/0129825 A1 6/2008 DeAngelis et al.
2011/0141141 A1* 6/2011 Kankainen ............... 345/632

FOREIGN PATENT DOCUMENTS

GB 2402011 11/2004
WO 9631047 10/1996

OTHER PUBLICATIONS

Communication of EPO in EP 10 737234.4—1241, Sep. 14, 2012.
International Search Report and Written Opinion of ISA in PCT/BE2010/000039, Sep. 27, 2010.
European Office Action for EP 10737234.4, dated May 2, 2013.

* cited by examiner

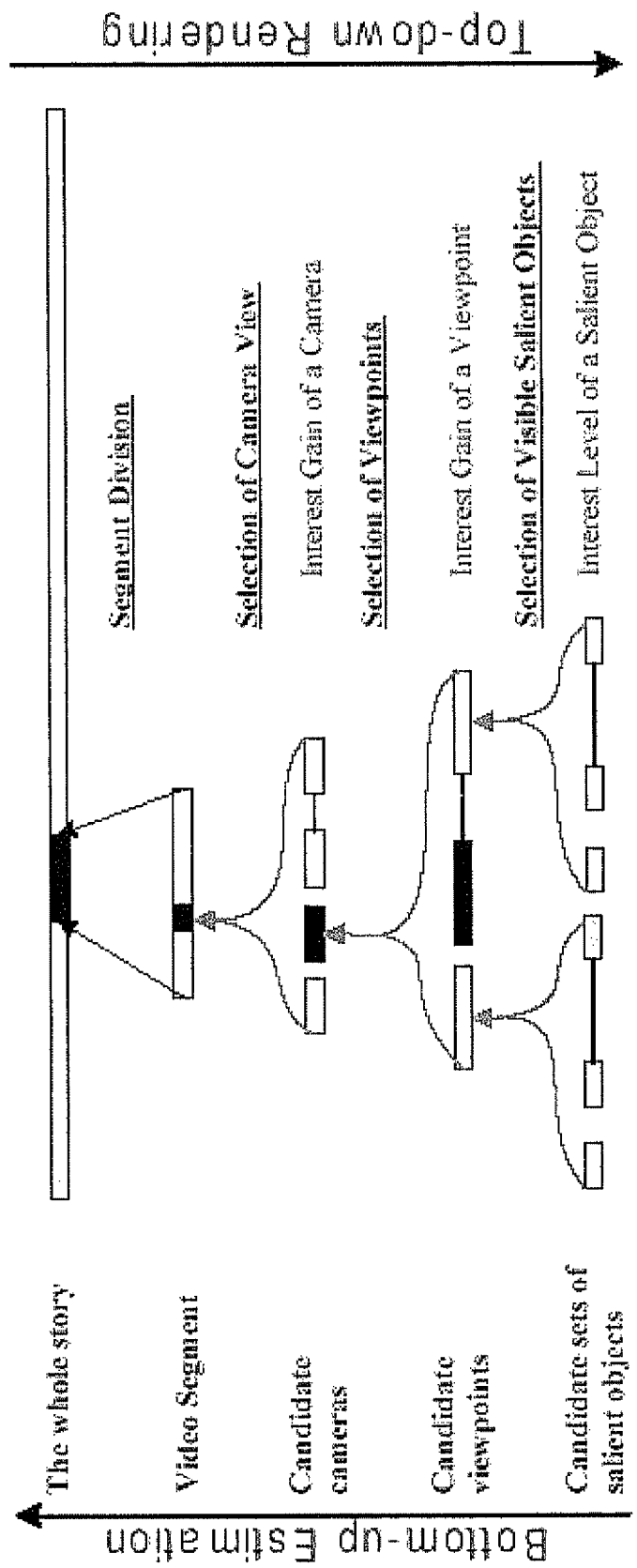
Figure 1: Hierarchical working flow in our personalized production.

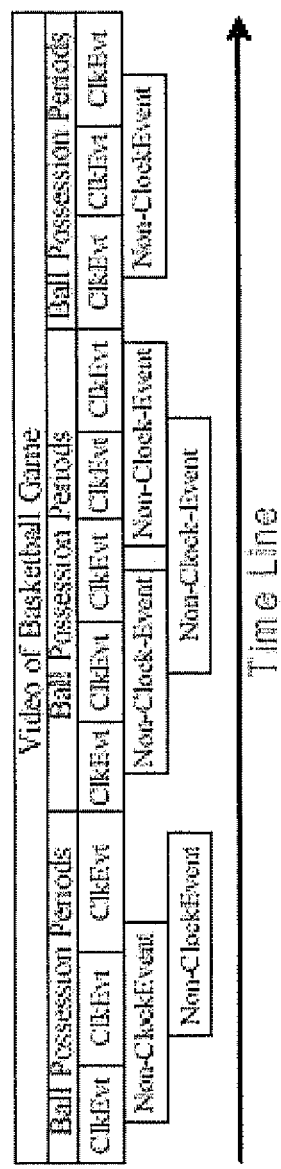
Figure 2: Hierarchical structure of basketball videos.

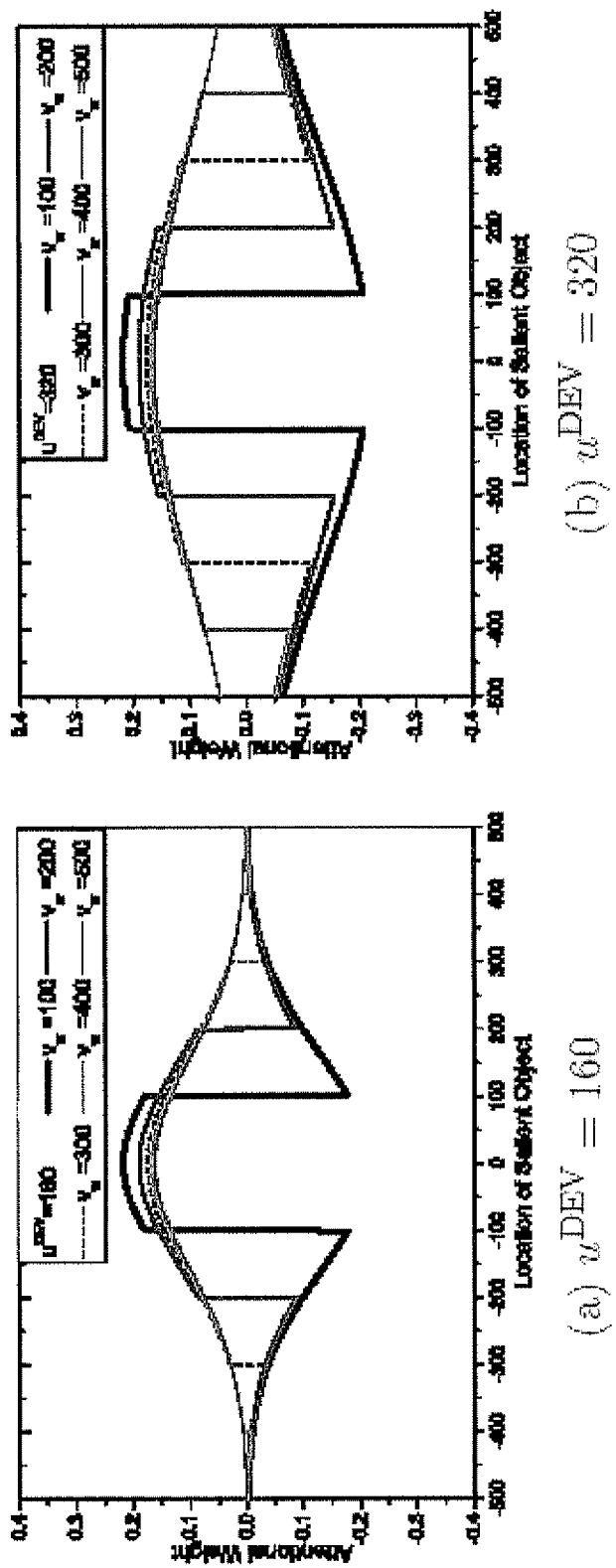
Figure 3: Attentional weighting function proposed in the present work. We trade-off between closeness and completeness by controlling the tail and the peak sharpness of the weighting function.

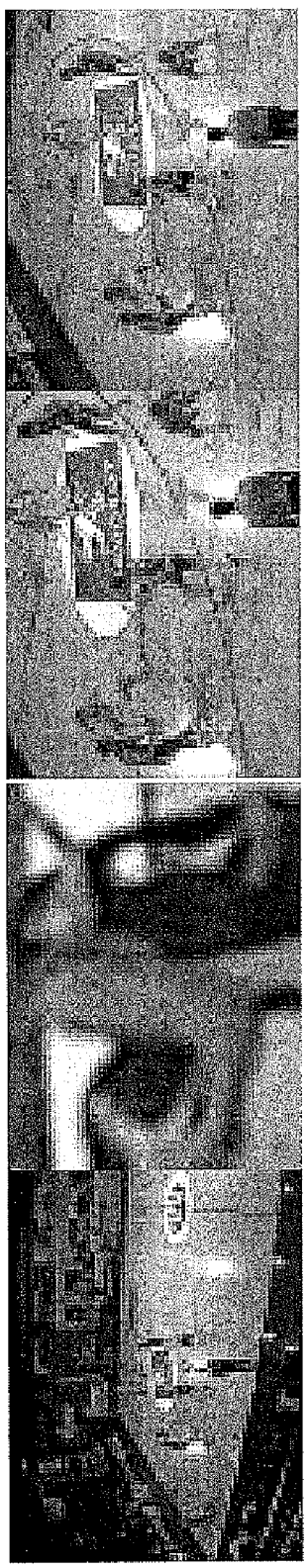
Figure 4: Behavior of viewpoint selection under different display sizes.

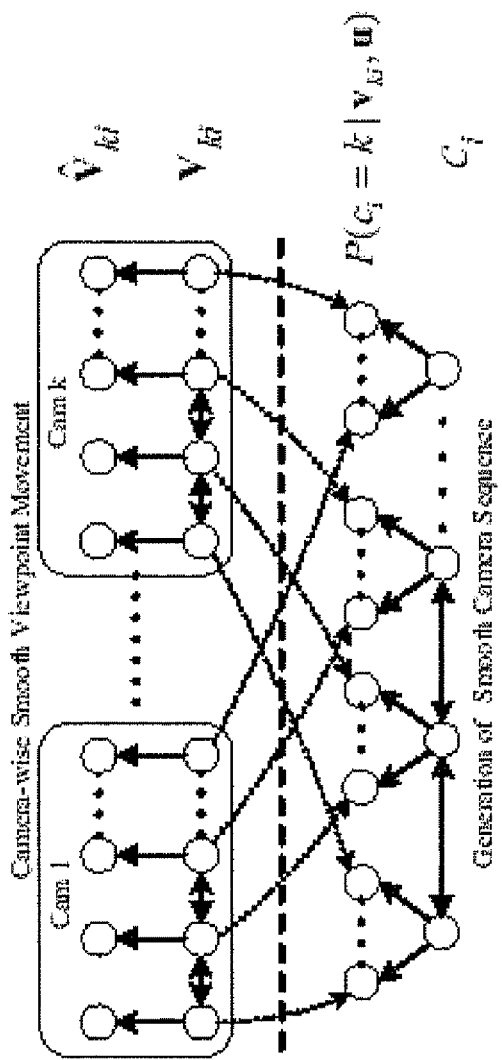
Figure 5: Graph model for two-step estimation of smooth viewpoint movement.

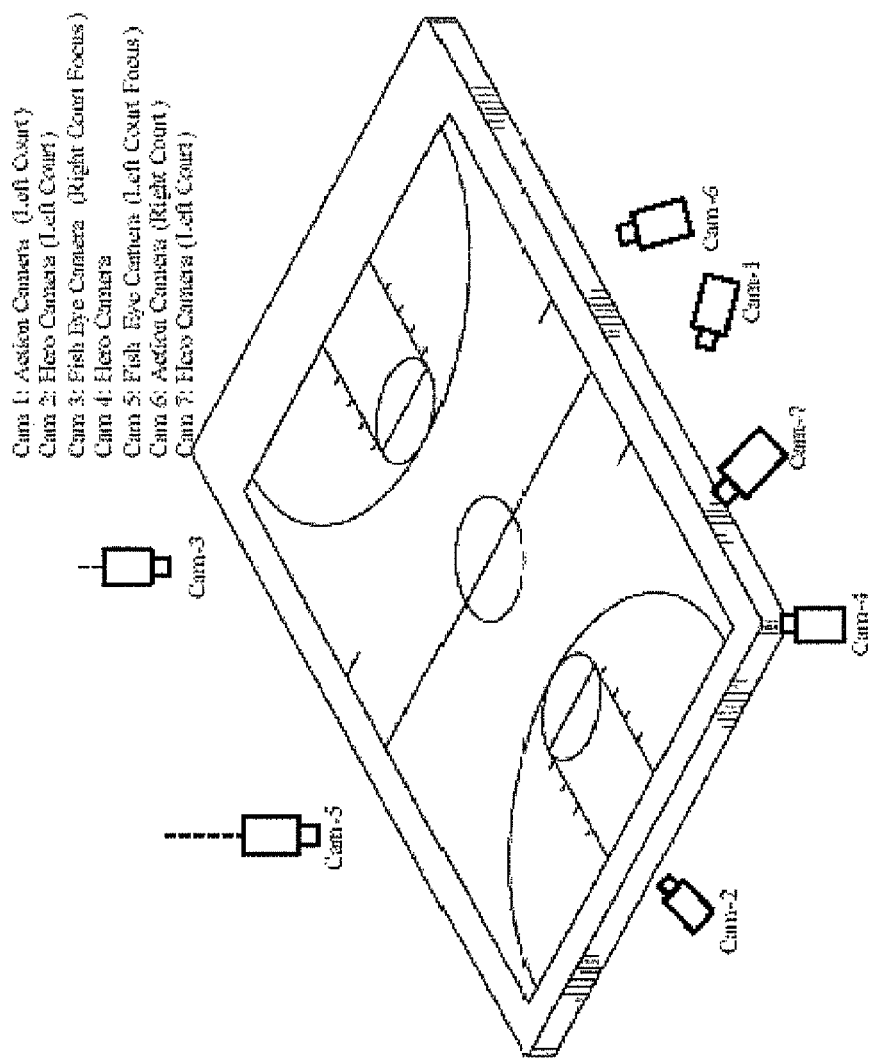
Figure 6. Camera plans in gathering experimental video data.

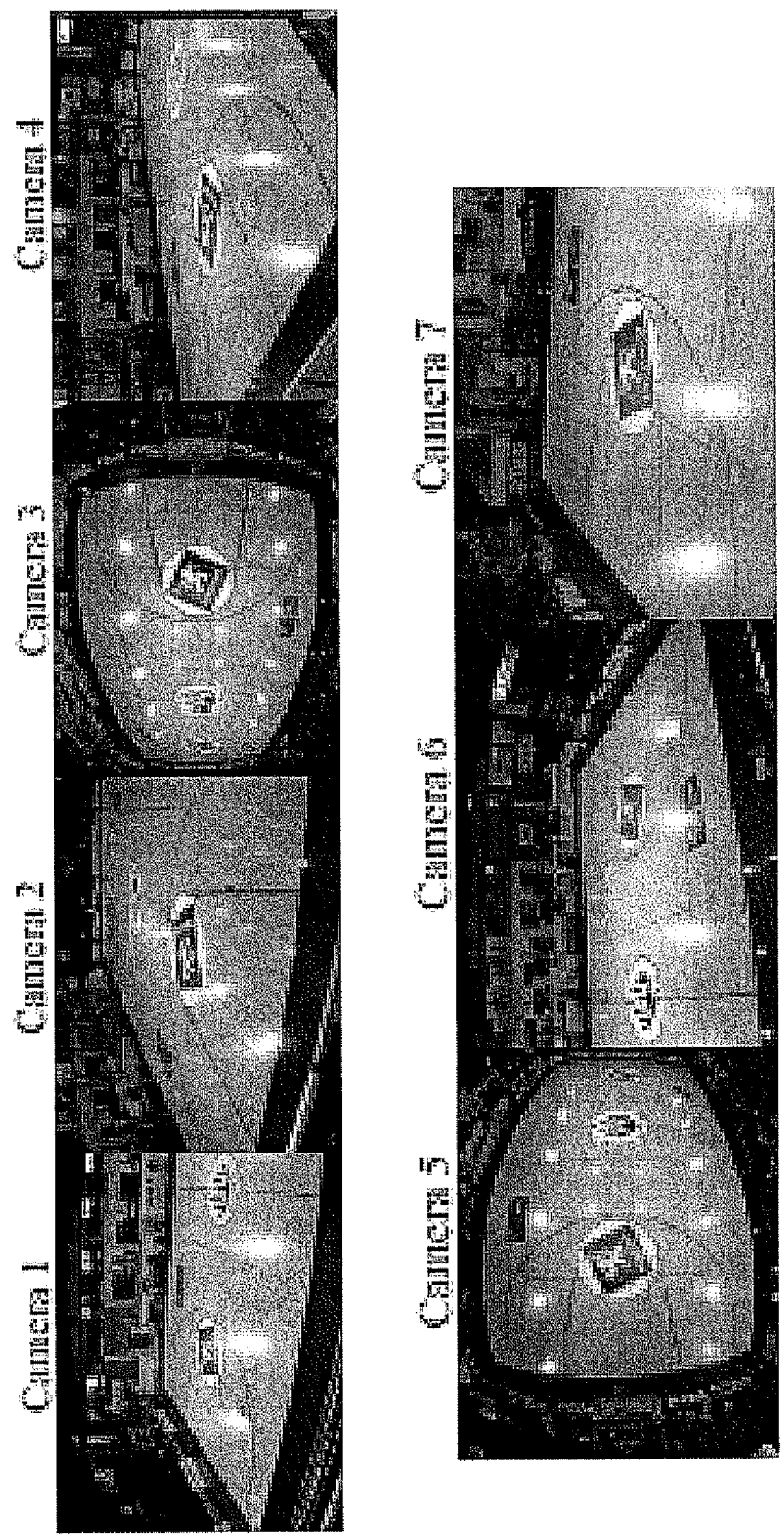
Figure 7: Sample views gathered by different cameras.

Figure 8: A short video clip with 1200 frames is used to demonstrate the system. There are five clock-events inside this clip. For each event, the most highlighted moment is marked in a red solid bar.

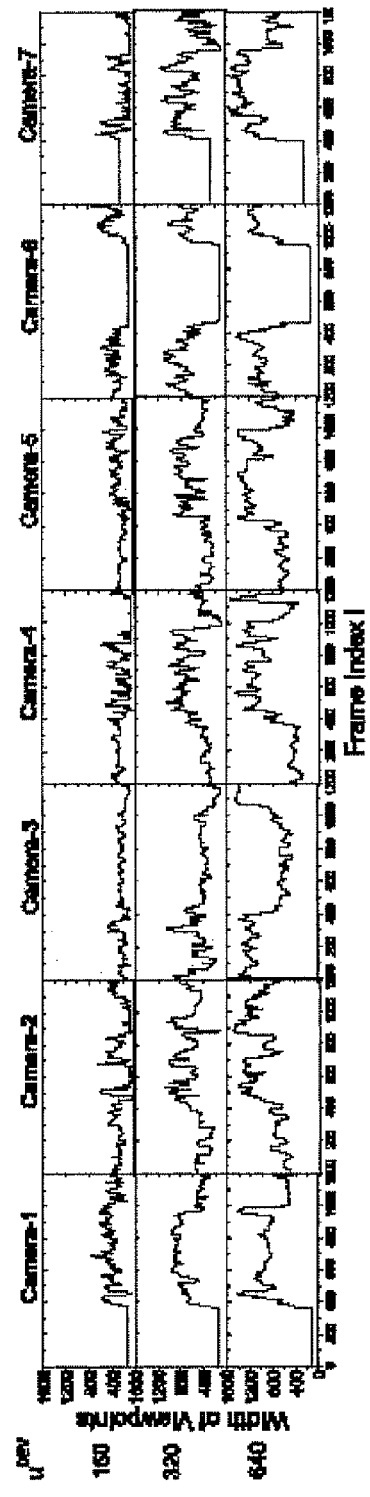

Figure 9: Camera-wise viewpoint sequences automatically selected under three different display resolutions. Weak viewpoint smoothing has been applied and the smoothing strength is set to $\sigma_2/\sigma_1 = 4$.

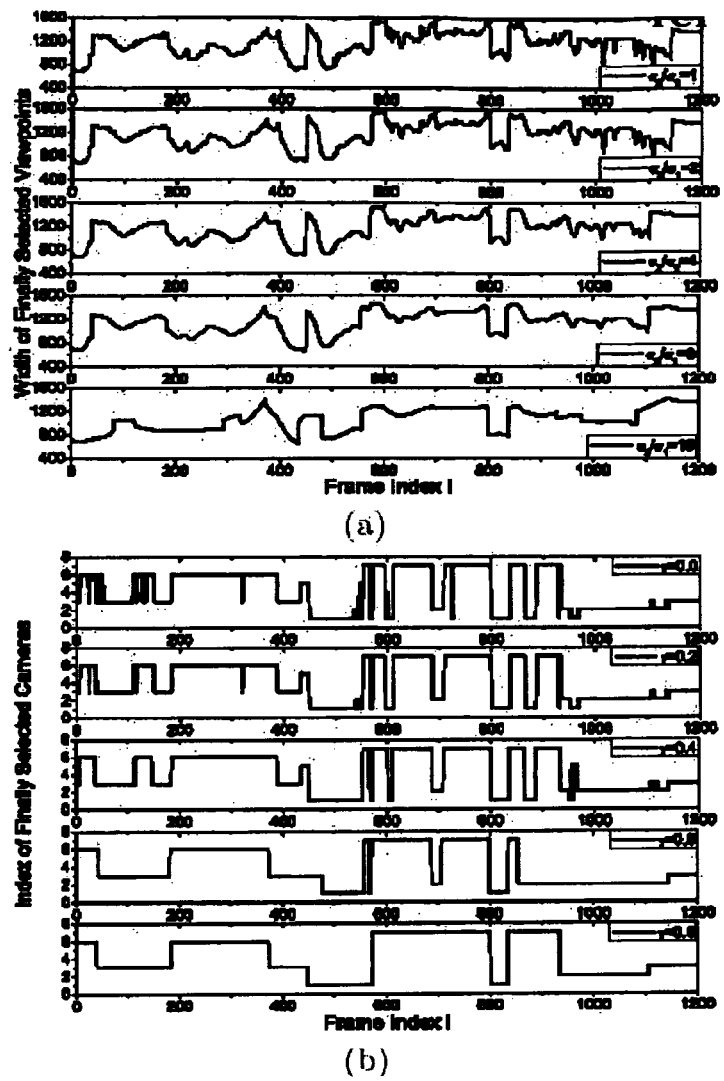
Figure 10: Behavior of optimized camera/viewpoint sequence under different smoothing strengths. Display resolution is set to $u^{DEV} = 640$.

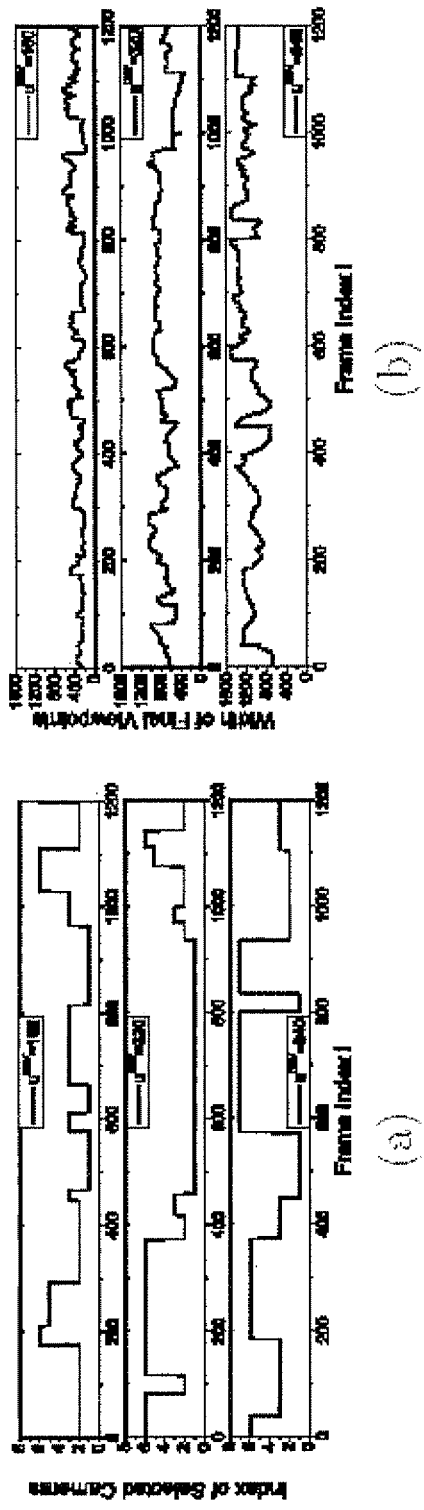
Figure 11: Comparison of generated camera and viewpoint sequences under three different display resolutions 160,320 and 640. Viewpoint smoothing strength is $\sigma_2/\sigma_1 = 4$ and camera smoothing strength $\gamma$ is set to 0.8.

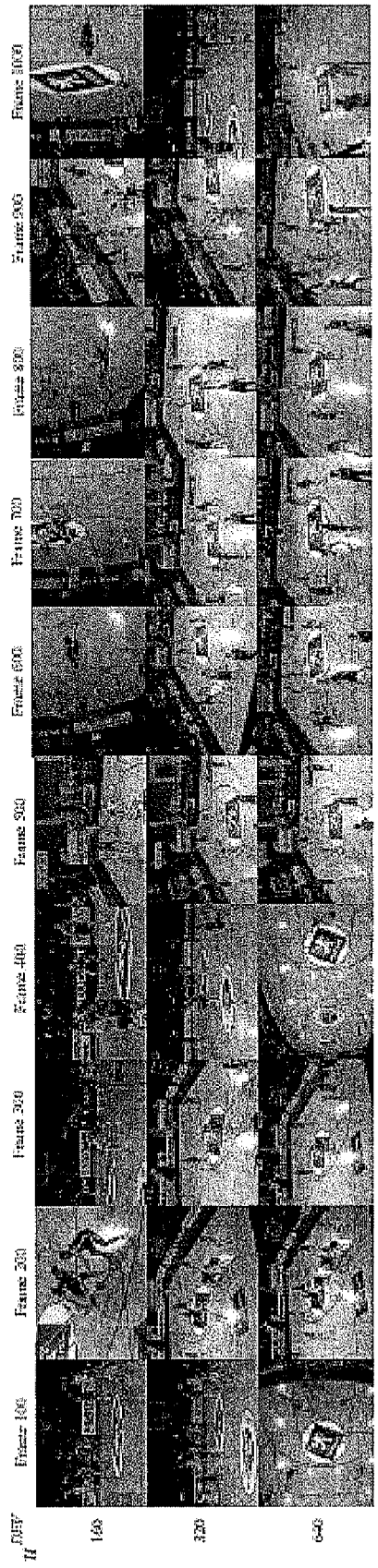
Figure 12: Thumbnails of frames in generated sequences under three different display resolutions 160, 320 and 640. Viewpoint smoothing strength is $\sigma_2/\sigma_1 = 4$ and camera smoothing strength $\gamma$ is set to 0.8.

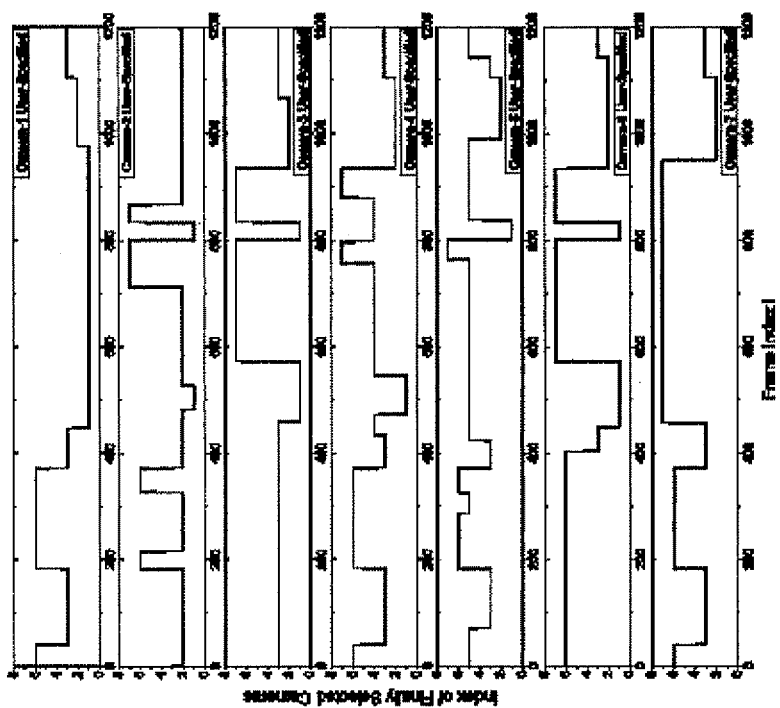
Figure 13: Comparison of generated camera sequences under different user-preferences on camera views for $u^{DEV} = 640$. Viewpoint smoothing strength is $\sigma_2/\sigma_1 = 4$ and camera smoothing strength $\eta$ is set to 0.8.

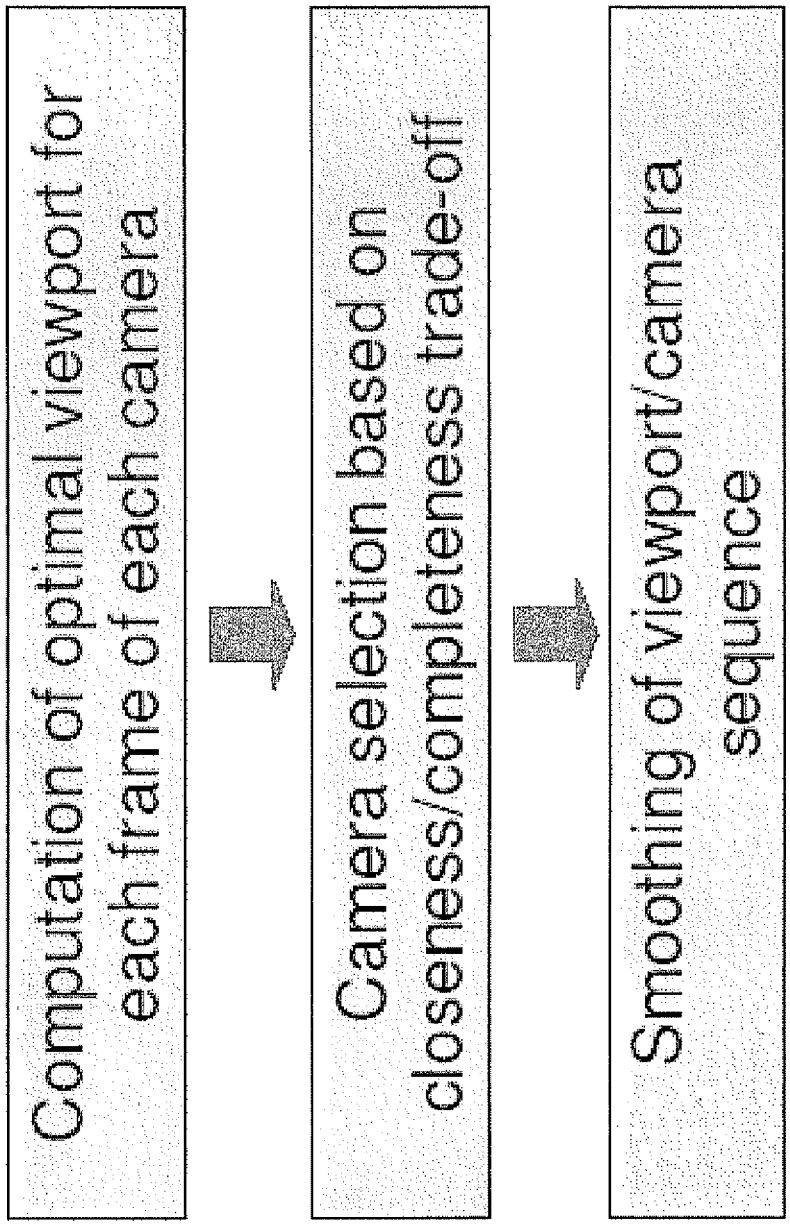
Figure 14: The proposed solution is implemented as a 3 steps process. It is worth noting that the viewport smoothing could as well be implemented within the corresponding camera view, before actual camera selection.

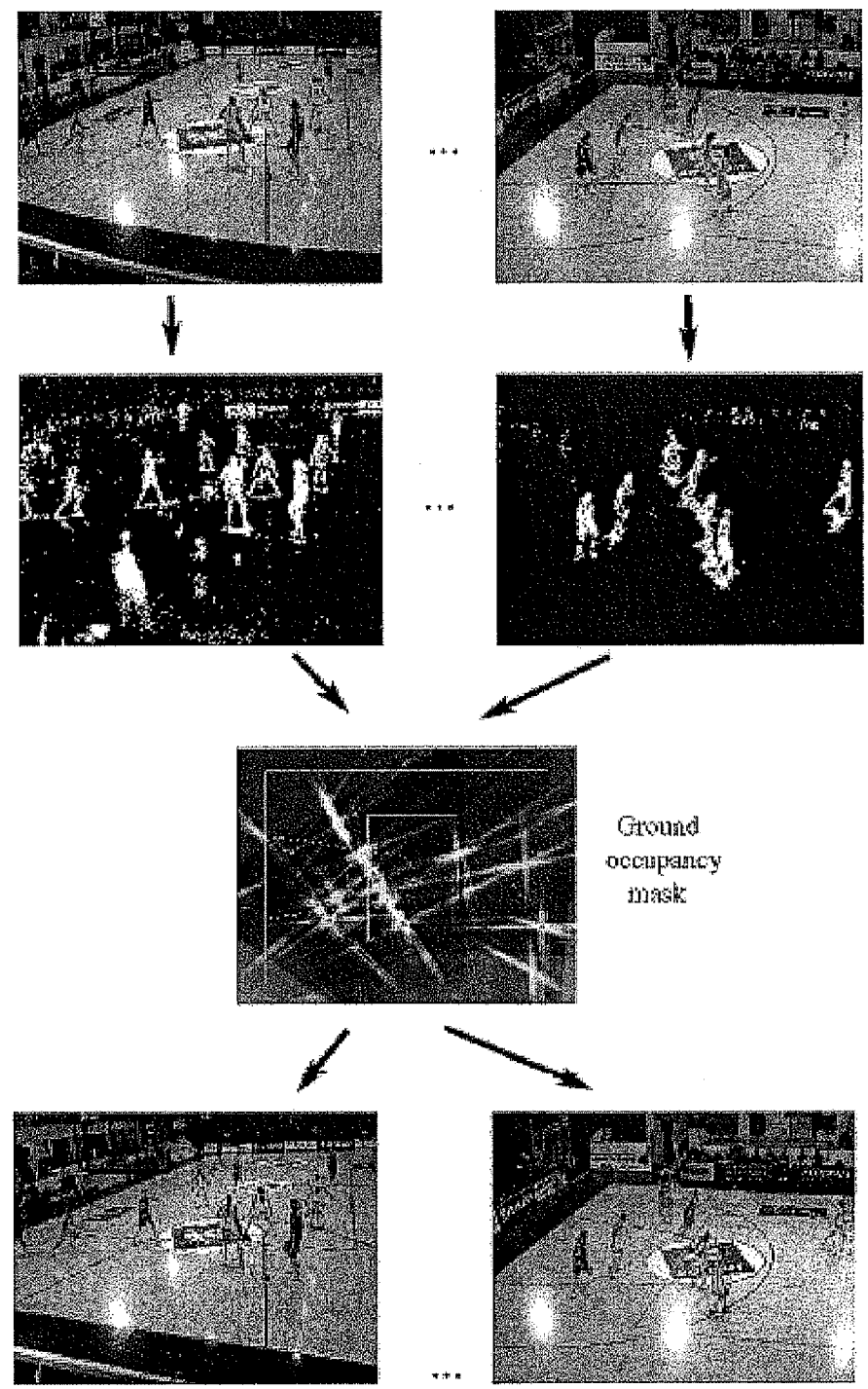
Figure 16: Foreground masks are merged to create a ground occupancy mask.

SYSTEMS AND METHODS FOR THE AUTONOMOUS PRODUCTION OF VIDEOS FROM MULTI-SENSORED DATA

FIELD OF THE INVENTION

The present invention relates to the integration of information from multiple cameras in a video system, e.g. a television production or intelligent surveillance system and to automatic production of video content, e.g. to render an action involving one or several persons and/or objects of interest.

TECHNICAL BACKGROUND

The APIDIS (Autonomous Production of Images based on Distributed and Intelligent Sensing) project tries to provide a solution to generate personalized contents for improved and low-cost visual representation of controlled scenarios such as sports television, where image quality and perceptual comfort are as essential as efficient integration of contextual information [1].

In the APIDIS context, multiple cameras are distributed around the action of interest, and the autonomous production of content involves three main technical questions regarding those cameras:
  (i) how to select optimal viewpoints, i.e. cropping parameters in a given camera, so that they are tailored to limited display resolution,
  (ii) how to select the right camera to render the action at a given time, and
  (iii) how to smooth camera/viewpoint sequences to remove production artefacts.

Production artefacts consist of both visual artefacts, which mainly means flickering effects due to shaking or fast zoom in/out of viewpoints, and story-telling artefacts such as the discontinuity of story caused by fast camera switching and dramatic viewpoint movements.

Data fusion of multiple cameras has been widely discussed in the literature. These previous works could be roughly classified into three major categories according to their various purposes. Methods in the first category deal with camera calibration and intelligent camera controlling by integrating contextual information of the multi-camera environment [4]. Reconstruction of 3D scene [5] or arbitrary viewpoint video synthesis [2] from multiple cameras is also a hot topic. The third category uses multiple cameras to solve certain problems such as occlusion in various applications, e.g., people tracking [6]. All these works focus much on the extraction of important 3D contextual information, but consider little on the technical questions mentioned above about video production.

Regarding autonomous video production, there are some methods proposed in the literature for selecting the most representative area from a standalone image. Suh et al. [7] defined the optimal cropping region as the minimum rectangle which contained saliency over a given threshold, where the saliency was computed by the visual attention model [8]. In Ref. [9], another attention model based method was proposed, where they discussed more the optimal shifting path of attention than the decision of viewpoint. It is also known to exploit a distributed network of cameras to approximate the images that would be captured by a virtual sensor located in an arbitrary position, with arbitrary viewpoint coverage. For few cameras with quite heterogeneous lens and scene coverage, most of the state-of-the-art free-viewpoint synthesis methods produce blurred results [2][3].

In Ref. [10] an automatic production system for soccer sports videos is proposed and viewpoint selection based on scene understanding was also discussed. However, this system only switches viewpoints among three fixed shot sizes according to several fixed rules, which leads to uncomfortable visual artefacts due to dramatic changing of shot sizes. Furthermore, they only discussed the single-camera case.

In addition to the above literature survey, several patent applications have considered (omnidirectional) multi-camera systems to produce and edit video content in a semi-automatic way. Three main categories of systems can be identified.

The first category selects one view (i.e. one video) among the ones covered by a pre-defined set of cameras, based on some activity detection mechanism. In [15], each camera is activated based on some external device, which triggers the video acquisition each time a particular event is detected (e.g. an object entering the field of view). In [16], audio sensors are used to identify the direction in which the video should be captures.

The second category captures a rich visual signal, either based on omnidirectional cameras or on wide-angle multi-camera setting, so as to offer some flexibility in the way the scene is rendered at the receiver-end. For example, the systems in [17] and [18] respectively consider multi-camera and omnidirectional viewing systems to capture and broadcast wide-angle video streams. In [17], an interface allows the viewer to monitor the wide-angle video stream(s) to select which portion of the video to unwrap in real time. Further, the operator can stop the playback and control pan-tilt-zoom effects in a particular frame. In [18], the interface is improved based on the automatic detection of the video areas in which an event participant is present. Hence, the viewer gets the opportunity to choose interactively which event participant (s)he would like to look at.

Similarly, [19-21] detect people of interest in a scene (typically a lecturer or a videoconference participant). However, the improvement over [18] is twofold. Firstly, in [19-21], methods are proposed to define automatically a set of candidate shots based on automatic analysis of the scene. Secondly, mechanisms are defined to select automatically a shot among the candidate shots. In [19], the shot definition relies on detection and tracking of the lecturer, and probabilistic rules are used to pseudo-randomly switch from the audience to the lecturer camera during a lecture. In [20] and [21], a list of candidate shots is also defined based on the detection of some particular object of interest (typically a face), but more sophisticated editing effects are considered to create a dynamic (videoconference) rendering. For example, one shot can pan from one person to another, or several faces can be pasted next to each other in a single shot. The edited output video is then constructed by selecting a best shot among the candidate shots for each scene (in [20] and [21], a scene corresponds to a particular period of time). The best shot is selected based on a pre-defined set of cinematic rules, e.g. to avoid too many of the same shot in a row.

It is worth noting that the shot parameters (i.e. the cropping parameters in the view at hand) stay fixed until the camera is switched. Moreover, in [19-21] a shot is directly associated to an object, so that in final, the shot selection ends up in selecting the object(s) to render, which might be difficult and irrelevant in contexts that are more complex than a videoconference or a lecture. Specifically, [19-21] do not select the shot based on the joint processing of the positions of the multiple objects.

The third and last category of semi-automatic video production systems differentiates the cameras that are dedicated to scene analysis from the ones that are used to capture the video sequences. In [22], a grid of cameras is used for sport scene analysis purposes. The outputs of the analysis module are then exploited to compute statistics about the game, but also to control pan-tilt-zoom (PTZ) cameras that collect videos of players of interest (typically the one that holds the puck or the ball). [22] must implement all scene analysis algorithms in real time, since it aims at controlling the PTZ parameters of the camera instantaneously, as a function of the action observed in the scene. More importantly and fundamentally, [22] selects the PTZ parameters to capture a specific detected object and not to offer appropriate rendering of a team action, potentially composed of multiple objects-of-interest. In this it is similar to [19-21]. Also, when multiple videos are collected, [22] does not provide any solution to select one of them. It just forwards all the videos to an interface that presents them in an integrated manner to a human operator. This is the source of a bottleneck when many source cameras are considered.

US2008/0129825 discloses control of motorized camera to capture images of an individual tracked object, e.g. for individual sports like athletics competitions. The user selects the camera through a user interface. The location units are attached to the object. Hence they are intrusive.

GB2402011 discloses an automated camera control using event parameters. Based on player tracking and a set of trigger rules, the field of view of cameras is adapted and switched between close, mid and far views. A camera is selected based on trigger events. A trigger event typically corresponds to specific movements or actions of sports(wo)men, e.g. the service of a tennis player, or to scoreboard information updates.

US2004/0105004A1 relates rendering talks or meetings. Tracking cameras are exploited to render the presenter or a member of the audience who asks a question. The presenter and the audience members are tracked based on sound source localization, using an array of microphones. Given the position of the tracking camera target, the PTZ parameters of the motorized camera are controlled so as to provide a smooth edited video of the target. The described method and system is only suited to follow a single individual person. With respect to the selection of the camera, switching is disclosed between a set of very distinct views (one overview of the room, one view of the slides, one close view on the presenter, and one close view a speaking audience member). The camera selection process is controlled based on event detection (e.g. a new slide appearing, or a member of the audience speaking) and videography rules defined by professionals, to emulate a human video production team.

REFERENCES

[1] Homepage of the APIDIS project. http://www.apidis.org/ Demo videos related to this paper: http://www.apidis.org/ Initial Results/APIDIS%20Initial%20Results.htm

[2] S. Yaguchi, and H. Saito, Arbitrary viewpoint video synthesis from multiple uncalibrated cameras, IEEE Trans. Syst. Man. Cybern. B, 34 (2004) 430-439.

[3] N. Inamoto, and H. Saito, Free viewpoint video synthesis and presentation from multiple sporting videos, Electronics and Communications in Japan (Part III: Fundamental Electronic Science), 90 (2006) 40-49.

[4] I. H. Chen, and S. J. Wang, An efficient approach for the calibration of multiple PTZ cameras, IEEE Trans. Automation Science and Engineering, 4 (2007) 286-293.

[5] P. Eisert, E. Steinbach, and B. Girod, Automatic reconstruction of stationary 3-D objects from multiple uncalibrated camera views, IEEE Trans. Circuits and Systems for Video Technology, Special Issue on 3D Video Technology, 10 (1999) 261-277.

[6] A. Tyagi, G. Potamianos, J. W. Davis, and S. M. Chu, Fusion of Multiple camera views for kernel-based 3D tracking, WMVC'07, 1 (2007) 1-1.

[7] B. Suh, H. Ling, B. B. Bederson, and D. W. Jacobs, Automatic thumbnail cropping and its effectiveness, Proc. ACM UIST 2003, 1 (2003) 95-104.

[8] L. Itti, C. Koch, and E. Niebur, A model of saliency-based visual attention for rapid scene analysis, IEEE Trans. Pattern Analysis and Machine Intelligence, 20 (1998) 1254-1259.

[9] X. Xie, H. Liu, W. Y. Ma, H. J. Zhang, "Browsing large pictures under limited display sizes, IEEE Trans. Multimedia, 8 (2006) 707-715.

[10] Y. Ariki, S. Kubota, and M. Kumano, Automatic production system of soccer sports video by digital camera work based on situation recognition, ISM'06, 1 (2006) 851-860.

[11] J. Owens, Television sports production, 4th Edition, Focal Press, 2007.

[12] J. W. Gibbs, Elementary principles in statistical mechanics, Ox Bow Press, 1981.

[13] D. Chandler, Introduction to modern statistical mechanics, Oxford University Press, 1987.

[14] C. De Vleeschouwer, F. Chen, D. Delannay, C. Parisot, C. Chaudy, E. Martrou, and A. Cavallaro, Distributed video acquisition and annotation for sport-event summarization, NEM summit, (2008).

[15] EP1289282 (A1) Video sequence automatic production method and system Inventor: AYER SERGE [CH]; MOREAUX MICHEL [CH] (+1); Applicant: DARTFISH S A [CH]; EC: H04N5/232 IPC: H04N5/232; H04N5/232; (IPC1-7): H04N5/232

[16] US20020105598, EP1352521 AUTOMATIC MULTI-CAMERA VIDEO COMPOSITION; INTEL CORP

[17] U.S. Pat. No. 6,741,250 Method and system for generation of multiple viewpoints into a scene viewed by motionless cameras and for presentation of a view path; BE HERE CORP

[18] US20020191071 Automated online broadcasting system and method using an omni-directional camera system for viewing meetings over a computer network; MICROSOFT CORP

[19] US20020196327 Automated video production system and method using expert video production rules for online publishing of lectures; MICROSOFT CORP; Microsoft Corporation

[20] US20060251382 A1 System and method for automatic video editing using object recognition MICROSOFT CORP

[21] US20060251384 Automatic video editing for real-time multi-point video conferencing; MICROSOFT CORP

[22] WO200599423 AUTOMATIC EVENT VIDEOING, TRACKING AND CONTENT GENERATION SYSTEM; AMAN JAMES A; BENNETT PAUL MICHAEL

ASPECTS OF THE PRESENT INVENTION

An object of the present invention is to provide computer based methods and systems for the autonomous production of an edited video, composed based on the multiple video streams captured by a network of cameras, distributed around a scene of interest.

The present invention provides an autonomous computer based method and system for personalized production of videos such as team sport videos such as basketball videos from multi-sensored data under limited display resolution. However the invention has a broader application range and is not limited just to this example. Embodiments of the present invention relate to the selection of a view to display from among the multiple video streams captured by the camera network. Technical solutions are provided to provide perceptual comfort as well as an efficient integration of contextual information, which is implemented, for example, by smoothing generated viewpoint/camera sequences to alleviate flickering visual artefacts and discontinuous story-telling artefacts. A design and implementation of the viewpoint selection process is disclosed that has been verified by experiments, which shows that the method and system of the present invention efficiently distribute the processing load across cameras, and effectively selects viewpoints that cover the team action at hand while avoiding major perceptual artefacts.

Accordingly the present invention provides a computer based method for autonomous production of an edited video from multiple video streams captured by a plurality of cameras distributed around a scene of interest, the method comprising:

detecting objects/persons of interest in the images of the video streams, e.g. knowing their actual 3D world coordinates, selecting for each camera the field of view that renders the scene of interest in a way that (allows the viewer to) follows the action carried out by the multiple and interacting objects/persons that have been detected. The field of view parameters refer, for example to the cropping window in a static camera, and/or to the pan-tilt-zoom and position parameters in a motorized and moving camera. The concept of action following can be quantified by measuring the amount of pixels associated to each object/persons of interest in the displayed image. Accurate following of the action results from complete and close rendering, where completeness count the number of objects/persons in the displayed image, while closeness measure the amount of pixels available to describe each object.

building the edited video by selecting and concatenating video segments provided by one or more individual cameras, in a way that maximizes completeness and closeness metrics along the time, while smoothing out the sequence of rendering parameters associated to concatenated segments.

The selecting of rendering parameters can be for all objects or objects-of-interest simultaneously. The knowledge about the position of the objects in the images can be exploited to decide how to render the captured action. The method can include selecting field of view parameters for the camera that renders action as a function of time based on an optimal balance between closeness and completeness metrics. For example, the field of view parameters refer to the crop in camera view of static cameras and/or to the pan-tilt-zoom or displacement parameters for dynamic and potentially moving cameras.

The closeness and completeness metrics can be adapted according to user preferences and/or resources. For example, a user resource can be encoding resolution. A user preference can be at least one of preferred object, or preferred camera. Images from all views of all cameras can be mapped to the same absolute temporal coordinates based a common unique temporal reference for all camera views. At each time instant, and for each camera view, field of view parameters are selected that optimize the trade-off between completeness and closeness. The viewpoint selected in each camera view can be rated according to the quality of its completeness/closeness trade-off, and to its degree of occlusions. For the temporal segment at hand, the parameters of an optimal virtual camera that pans, zooms and switches across views can be computed to preserve high ratings of selected viewpoints while minimizing the amount of virtual camera movements.

The method can include selecting the optimal field of view in each camera, at a given time instant.

A field of view $v_k$ in the $k^{th}$ camera view is defined by the size $S_k$ and the center $c_k$ of the window that is cropped in the $k^{th}$ view for actual display. It is selected to include the objects of interest and to provide a high resolution description of the objects, and an optimal field of view $v_k^*$ is selected to maximize a weighted sum of object interests as follows $$v_k^* = \underset{\{S_k, c_k\}}{\operatorname{argmax}} \sum_{n=1}^{N} I_n \cdot \alpha(S_k, u) \cdot m\left(\frac{\|x_{n,k} - c_k\|}{S_k}\right)$$

where, in the above equation:

$I_n$ denotes the level of interest assigned to the $n^{th}$ object detected in the scene.

$x_{n,k}$ denotes the position of the $n^{th}$ object in camera view k.

The function $m(\ldots)$ modulates the weights of the $n^{th}$ object according to its distance to the center of the viewpoint window, compared to the size of this window (e.g., see FIG. 3).

The vector u reflects the user preferences, in particular, its component $u_{res}$ defines the resolution of the output stream, which is generally constrained by the transmission bandwidth or end-user device resolution.

The function $\alpha(.)$ reflects the penalty induced by the fact that the native signal captured by the $k^{th}$ camera has to be sub-sampled once the size of the viewpoint becomes larger than the maximal resolution $u_{res}$ allowed by the user.

Preferably $\alpha(\ldots)$ decreases with Sk and the function $\alpha(\ldots)$ is equal to one when $S_k < u_{res}$, and decrease afterwards. $\alpha(\ldots)$ is defined by:

$$\alpha(S, u) = \left[\min\left(\frac{u_{res}}{S}, 1\right)\right]^{u_{close}},$$

where the exponent $u_{close}$ is larger than 1, and increases as the user prefers full-resolution rendering of zoom-in area, compared to large but sub-sampled viewpoints.

The method includes rating the viewpoint associated to each camera according to the quality of its completeness/closeness trade-off, and to its degree of occlusions. The highest rate should correspond to a view that (1) makes most object of interest visible, and (2) is close to the action, meaning that it presents important objects with lots of details, i.e. a high resolution. Formally, given the interest $I_n$ of each player, the rate $I_k(v_k, u)$ associated to the $k^{th}$ camera view is defined as follows:

$$I_k(v_k, u) = \sum_{n=1}^{N} I_n \cdot o_k(x_n | \bar{x}) \cdot h_k(x_n) \cdot \beta_k(S_k, u) \cdot m\left(\frac{\|x_{n,k} - c_k\|}{S_k}\right)$$

where, in the above equation:

$I_n$ denotes the level of interest assigned to the $n^{th}$ object detected in the scene.

$x_n$ denotes the position of the $n^{th}$ object in the 3D space;

$o_k(x_n | x)$ measures the occlusion ratio of the $n^{th}$ object in camera view k, knowing the position of all other objects, the occlusion ratio of an object being defined to be the fraction of pixels of the object that are hidden by other objects when projected on the camera sensor;

The height $h_k(x_n)$ is defined to be the height in pixels of the projection in view k of a reference height of a reference object located in $x_n$. The value of $h_k(x_n)$ is directly computed based on camera calibration, or when calibration is not available, it can be estimated based on the height of the object detected in view k.

The function $\beta_k(.)$ reflects the impact of the user preferences in terms of camera view and display resolution. $\beta_k(.)$ is defined as $$\beta_k(S,u)=u_k \cdot \alpha(S,u),$$

where $u_k$ denotes the weight assigned to the $k^{th}$ camera, and $\alpha(S,u)$ is defined above.

The method may comprise smoothing the sequence of camera indices and corresponding viewpoint parameters, wherein the smoothing process is for example implemented based on two Markov Random Fields, linear or non-linear low-pass filtering mechanism, or via a graph model formalism, solved based on conventional Viterbi algorithm.

The capturing of the multiple video streams may be by static or dynamic cameras.

The present invention also includes a computer based system comprising a processing engine and memory for autonomous production of an edited video from multiple video streams captured by a plurality of cameras distributed around a scene of interest, adapted to carry out any of the methods of the present invention. The system can comprise:
- a detector for detecting objects in the images of the video streams,
- first means for selecting one or more camera viewpoints based on joint processing of positions of multiple objects that have been detected,
- second means for selecting rendering parameters that maximize and smooth out closeness and completeness metrics by concatenating segments in the video streams provided by one or more individual cameras.

The computer based system can have
- means for detecting objects/persons of interest in the images of the video streams, e.g. knowing their actual 3D world coordinates,
- means for selecting for each camera the field of view that renders the scene of interest in a way that (allows the viewer to) follows the action carried out by the multiple and interacting objects/persons that have been detected. The field of view parameters refer, for example to the cropping window in a static camera, and/or to the pan-tilt-zoom and position parameters in a motorized and moving camera. The concept of action following can be quantified by measuring the amount of pixels associated to each object/persons of interest in the displayed image. Accurate following of the action results from complete and close rendering, where completeness count the number of objects/persons in the displayed image, while closeness measure the amount of pixels available to describe each object.
- Means for building the edited video by selecting and concatenating video segments provided by one or more individual cameras, in a way that maximizes completeness and closeness metrics along the time, while smoothing out the sequence of rendering parameters associated to concatenated segments.

The present invention also provides a computer program product that comprises code segments which when executed on a processing engine execute any of the methods of the invention or implement any system according to the invention.

The present invention also includes a non-transitory machine readable signal storage medium storing the computer program product.

The present invention can deal with scenes involving several interacting moving persons/objects of interest. In the following, those scenes are denoted as team actions, and typically correspond to the scenes encountered in team sports context.

Automating the production process allows to:
Reduce the production costs, by avoiding long and tedious hand-made processes, both for camera control and camera selection;
Increase the production bandwidth and quality, by potentially handling an infinite number of cameras simultaneously;
Create personalized content, by repeating the production process several times, with distinct parameters.

An aim of the present invention is to target the production of semantically meaningful, i.e. showing the action of interest, and perceptually comfortable contents from raw multi-sensored data. The system according to the present invention is computer based including memory and a processing engine and is a computationally efficient production system, e.g. based on a divide-and-conquer paradigm (see FIG. 15).

In embodiments, the best field of view is first computed for each individual camera, and then the best camera to render the scene is selected. Together the camera index and its field of view define the viewpoint to render the action. When the camera is fixed, field of view definition is limited to a crop of the image captured by the camera. When the camera is motorized, the field of view directly results from the pan-tilt-zoom parameters of the camera, and can thus capture an arbitrary rectangular portion of the light field reaching the centre of the camera.

To define in a quantitative manner the notion of best field of view or best camera index, the present invention introduces three important concepts, which are "completeness", "closeness" and "smoothness". Completeness stands for the integrity of action rendering. In the context of team action rendering, the completeness measures how well the objects/persons of interest in the scene (typically the players participating to a team sport) are included in the displayed image. Closeness defines the fineness of detail description (typically the average amount of pixels that are available to render the persons/objects of interest), and smoothness is a term referring to the continuity of viewpoint selection. By trading off among those factors, methods are provided for selecting (as a function of time) optimal viewpoints to fit the display resolution and other user preferences, and for smoothing these sequences for a continuous and graceful story-telling. The present invention is completely autonomous and self-governing, in the sense that it can select the pixels to display without any human intervention, based on a default set of production parameters and on the outcomes of people detection systems. But the invention can also deal with user-preferences, such as user's narrative profile, and device capabilities. Narrative preferences can be summarized into four descriptors, i.e., user preferred group of objects or "team", user preferred object or "player", user preferred 'view type' (e.g. close zoom-in or far zoom-out views), and user preferred "camera". All device constraints, such as display resolution, network speed, decoder's performance, are abstracted as the output resolution parameter, which denotes the resolution at which the output video is encoded to be conveyed and displayed at the end-host.

The capability to take those preferences into account depends on the knowledge captured about the scene, e.g. through video analysis tools. For example, an embodiment of the present invention has been implemented in "Detection and Recognition of Sports(wo)men from Multiple Views", D. Delannay, N. Danhier, and C. De Vleeschouwer, *Third ACM/IEEE International Conference on Distributed Smart Cameras*, Como, Italy, September 2009 to automatically track and recognize the moving players in the scene of interest. This document is included as Appendix 2.

First, in embodiments of the present invention a set of cameras that (partly) cover the same area are considered, which are likely to be activated simultaneously based on any activity detection mechanism which is another important advantage of the present invention over the prior art. The purpose of the invention is thus not to select a camera view based on the fact that some activity was detected in the view. Rather, the objective is to select along the time the camera view and its corresponding variations in parameters such as cropping or PTZ parameters, to best render the action occurring in the covered area. Here quality of rendering refers to the optimization of a trade-off between measures of closeness, completeness, and smoothness.

Second, the present invention has an advantage of dynamically adapting and smoothing out viewpoint parameters with time, which is an improvement over prior art systems in which the shot parameters (e.g. the cropping parameters in the view at hand) stay fixed until the camera is switched.

Third, in embodiments of the present invention a choice between one object or another is not made, but rather a selection is made of the viewpoint based on the joint processing of the positions of the multiple objects that have been detected. In accordance with embodiments of the present invention a selection is made of the viewpoints sequence that is optimal in the way it maximizes and smoothes out closeness and completeness metrics e.g. for all objects simultaneously.

Those differences compared to previous art bring significant benefits when addressing the content production problem, e.g. in a team sport context. It primarily allows following the action of moving and interacting players, which was not possible based on prior art methods.

Preferably, the methods and systems of the present invention capture and produce content automatically, without the need for costly handmade processes (no technical team or cameraman is needed).

As a consequence of its cost-effectiveness, the present invention aims at keeping the production of content profitable even for small- or medium-size targeted audiences. Thereby, it promotes the emergence of novel markets, offering a large choice of contents that are of interest for a relatively small number of users (e.g. the summary of a regional sport event, a university lecture, or a day at the nursery).

In addition, automating the production enables content access personalisation. Generating a personalised video simply consists in (re-)running the production process with input parameters corresponding to the specific preferences or constraints expressed by the user.

An aim of the present invention is to produce a video report of an event based on the concatenation of video (and optionally corresponding audio) segments captured by a set of cameras. In practice, both static and dynamic cameras can be manipulated by the present invention:

Using static sensors adds to cost-effectiveness because it permits to store all relevant content and to process it off-line, to select the fragments of streams that are worth being presented to the viewer.

The autonomous production principles described below could as well be used to control a (set of) dynamic PTZ camera(s). In that case, the information about the location of object-of-interests has to be provided in real-time, e.g. based on the real time analysis of the signal captured by some audio-visual sensors (as done in [ref]), or based on information collected from embedded transmitters. Moreover, the space of candidate fields of view is defined by the position and control parameters of the PTZ camera, and not by the cropped image within the view angle covered by the static camera.

The main assumption underlying the networked acquisition setting is the existence of a common unique temporal reference for all camera views, so that the images from all cameras can be mapped to the same absolute temporal co-ordinates of the scene at hand. The cameras are thus assumed to be loosely, but not necessarily tightly, synchronized. Here, the loose synchronization refers to a set of cameras that capture images independently, and that relies on timestamps to associate the images that have been captured at similar, but not necessarily identical, time instants. In contrast, a tight synchronization would refer to synchronized capture of the images by the cameras, as done when acquisition is controlled by a common trigger signal.

To decide about how to render the team action at hand, the invention has to know the position of objects-of-interest in the scene. This knowledge might be an (error-prone) estimate, and can refer either to the position of objects in the 3D scene, or to the position of objects in each one of the camera views.

This information can be provided based on transmitters that are carried by the objects to be tracked in the scene of interest. This knowledge can also be provided by a non-intrusive alternative, e.g. by exploitation of a set of video signals captured by a network of static cameras, e.g. the ones used for video report production, to detect and track the objects-of-interest. The method is described in "Detection and Recognition of Sports(wo)men from Multiple Views, D. Delannay, N. Danhier, and C. De Vleeschouwer, *Third ACM/IEEE International Conference on Distributed Smart Cameras*, Como, Italy, September 2009" which is incorporated herein by reference in its entirety. It builds on a background reference model to identify the pixels that change in each view. When the multiple views are calibrated, e.g. through an off-line process, the change detection masks that are collected in each view can be merged, e.g. in a ground occupancy mask, to identify the position of objects-of-interest in the 3D space (see for example the approach depicted in FIG. 16). Particle filters or graph-based techniques can then be used to link occurrences of the same object along the time line. Note that such detection and tracking techniques are well known to those skilled in the art, and will not be described in detail herein. The embodiment of these algorithms that has been implemented is described in the reference above, and offers the advantage of handling occlusions in a computationally efficient way.

Once the positions of the objects-of-interest are known, the invention supports autonomous production (=selection of viewpoints along the time) of the content captured by the network of static cameras[2]. The approach is generic in the sense that it can integrate a large range of user preferences including transmission or display resources, semantic interest (like preferred player), or narrative preferences (dealing with the preferred way to visualize the story, e.g. preferred camera or zoom-in factor).

Over a given time period, the present invention aims at selecting the sequence of viewpoints that optimizes scene rendering along the time, with respect to the detected persons/objects-of-interest. Here, a viewpoint refers to a camera index and to the window that is cropped in that particular camera view, for actual display.

The optimization of the sequence of viewpoints builds on a number of notions and principles that can be described as follows.

At each time instant, the optimization of the rendering has to:

Maximize the notion of completeness, which measures to which extent the (pixels of the) objects-of-interest are included and visible within the displayed viewpoint. Optionally this involves minimizing the degree of object occlusion, which measures the fraction of an object that is present in the scene, but is (e.g. at least partly) hidden by other objects;

Maximize the notion of closeness, which refers to the fineness of details, i.e. the density of pixels or resolution, when rendering the objects-of-interest.

Those two objectives are often antagonists. For this reason, methods and systems according to embodiments of the present invention propose to balance completeness and closeness, optionally as a function of individual user preferences (in terms of viewpoint resolution, or preferred camera or players for example).

Finally, smoothness of transitions between the rendering parameters of consecutive frames of the edited video has also to be taken into account when considering the production of a temporal segment. In other words, it is important to preserve consistency between the camera and for example cropping parameters that are selected along the time line, to avoid distracting the viewer from the story by abrupt changes or constant flickering.

Based on those guiding principles, the three step process depicted in FIG. 14 has been developed. It can be described as follows:

Step 1: At each time instant, and for each camera view, select the variations in parameters such as cropping parameters that optimize the trade-off between completeness and closeness. Optionally, the completeness/closeness trade-off is measured as a function of the user preferences. For example, depending on the resolution at which (s)he accesses the produced content, a user might prefer a small (zoom-in) or a large (zoom-out) viewpoint.

Step 2: Rate the field of view selected in each camera view according to the quality (in terms of user preferences) of its completeness/closeness trade-off, and to its degree of occlusions.

Step 3: For the temporal segment at hand, compute the parameters of an optimal virtual camera that pans, zooms and switches across cameras to preserve high ratings of selected viewpoints while minimizing the amount of virtual camera movements.

The first step consists in selecting the optimal field of view for each camera, at a given time instant. To simplify notations, in the following, we omit the time index t.

A field of view $v_k$ in the $k^{th}$ static camera is defined by the size $S_k$ and the center $c_k$ of the window that is cropped in the $k^{th}$ view for actual display.

It has to be selected to:
Include the objects of interest;
Provide a fine, i.e. high resolution, description of those objects.

The optimal field of view $v_k^*$ is selected preferably according to user preferences, to maximize a weighted sum of object interests as follows $$v_k^* = \operatorname*{argmax}_{\{S_k, c_k\}} \sum_{n=1}^{N} I_n \cdot \alpha(S_k, u) \cdot m\left(\frac{\|x_{n,k} - c_k\|}{S_k}\right)$$

In the above equation:

$I_n$ denotes the level of interest assigned to the $n^{th}$ object recognized in the scene. This assignment can be done by any suitable method and the present invention assumes that this assignment has been completed and the results can be used by the present invention. These levels of interest can be defined by the user, e.g. once for the entire event, and made available to the present invention. In application scenarios for which object are detected but not labelled, the weight is omitted, i.e. replaced by a constant unitary value.

$x_{n,k}$ denotes the position of the $n^{th}$ object in camera view k.

The function $m(.)$ modulates the weights of the $n^{th}$ object according to its distance to the center of the viewing window, compared to the size of this window. Intuitively, the weight should be high and positive when the object-of-interest is located in the center of the display window, and should be negative or zero when the object lies outside the viewing area. Hence, $m(.)$ should be positive between 0 and 0.5, and lower or equal to zero beyond 0.5. Many functions are appropriate, and the choice of a particular instance could for example be driven based on computational issues. Examples of functions are the well-known Mexican hat or Gaussian functions. Another example is provided in detail in a particular embodiment of the invention described in appendix 1 of this application.

The vector u reflects the user constraints or preferences in terms of viewing window resolution and camera index. In particular, its component $u_{res}$ defines the resolution of the output stream, which is generally constrained by the transmission bandwidth or end-user device resolution. Its component $u_{close}$ is set to a value larger than 1 that increases to favour close viewpoints compared to large zoom-out views. The other components of u are dealing with camera preferences, and are defined below, while describing the second step of the invention.

The function $\alpha(.)$ reflects the penalty induced by the fact that the native signal captured by the $k^{th}$ camera has to be down-sampled once the size of the viewpoint becomes larger than the maximal resolution $u_{res}$ allowed by the user. This function typically decreases with $S_k$. An appropriate choice consists in setting the function equal to one when $S_k < u_{res}$, and in making it decrease afterwards. An example of $\alpha(.)$ is defined by $$\alpha(S, u) = \left[\min\left(\frac{u_{res}}{S}, 1\right)\right]^{u_{close}},$$

where the exponent $u_{close}$ is larger than 1, and increases to favour close viewpoints compared to large zoom-out field of views.

It is worth noting that the trade-offs reflected in the above equation can be formulated in many different but equivalent ways. An example of alternative, but equivalent, formulation has been implemented in the embodiment of the invention defined in appendix 1. In this formulation the sum of product has been replaced by a product of sums, without fundamentally affecting the key idea of the invention, which consists in trading-off closeness and completeness according to user constraints (regarding output resolution) and preferences (regarding zoom-out or zoom-in viewpoints).

The second step rates the viewpoint associated to each camera according to the quality of its completeness/closeness trade-off, and to its degree of occlusions. The highest rate should correspond to a view that (1) makes most object of interest visible, and (2) is close to the action, meaning that it presents important objects with lots of details, i.e. a high resolution.

Formally, given the interest $I_n$ of each player, the rate $I_k(v_k, u)$ associated to the $k^{th}$ camera view is defined as follows:

$$I_k(v_k, u) = \sum_{n=1}^{N} I_n \cdot o_k(x_n | \bar{x}) \cdot h_k(x_n) \cdot \beta_k(S_k, u) \cdot m\left(\frac{\|x_{n,k} - c_k\|}{S_k}\right)$$

In the above equation:
$I_n$ denotes the level of interest assigned to the $n^{th}$ object detected in the scene.
$x_n$ denotes the position of the $n^{th}$ object in the 3D space;
$o_k(x_n|x)$ measures the occlusion ratio of the $n^{th}$ object in camera view k, knowing the position of all other objects. The occlusion ratio of an object is defined to be the fraction of pixels of the object that are hidden by other objects when projected on the camera sensor.
The height $h_k(x_n)$ is defined to be the height in pixels of the projection in view k of a six feet tall vertical object located in $x_n$. Six feet is the average height of the players. The value of $h_k(x_n)$ is directly computed based on camera calibration. When calibration is not available, it can be estimated based on the height of the object detected in view k.
The function $\beta_k(.)$ reflects the impact of the user preferences in terms of camera view and display resolution. Formally, $\beta_k(.)$ can be defined as $\beta_k(S,u) = u_k \cdot \alpha(S,u),$ where $u_k$ denotes the weight assigned to the $k^{th}$ camera, and $\alpha(S,u)$ is defined as above.

Similar to what has been told about the first step, it is worth mentioning that alternative formulation of the same basic idea can be imagined. For example, the embodiment of the invention that is described in the appendix 1 defines the function to maximize based on the product of a closeness factor with a completeness factor, each factor measuring a weighted sum of individual object display resolution and visibility. Hence, it replaces the sum of product by a product of sums, but still follows the same basic idea of taking user preferences into account while trading off two antagonist terms, reflecting the concept of closeness and completeness, respectively.

Similarly, a formulation based on the weighted sum of two terms reflecting the closeness and the completeness concepts described above is also an embodiment of the present invention.

The third and last step consists in smoothing the sequence of camera indices and corresponding viewpoint parameters.

In the proposed embodiment of the invention, the smoothing process is implemented based on the definition of two Markov Random Fields (see FIG. 5, and the description of the embodiment below). Other embodiments can as well build on any linear or non-linear low-pass filtering mechanism to smooth out the sequence of camera indices and viewpoints parameters. The smoothing could also be done through a graph model formalism, solved based on conventional Viterbi algorithm. In that case, graph vertices would correspond to candidate rendering parameters for a given frame, while edges would connect candidate rendering states along the time. The cost assigned to each edge would reflect the disturbance induced by a change of rendering parameters between two consecutive frames.

The automated video production system and method also includes a virtual director, e.g. a virtual director module for selecting and determining which of the multiple camera video streams are a current camera stream to be viewed. The virtual director, at each time instant, and for each camera view, selects the variations in parameters, e.g. in cropping parameters that optimize the trade-off between completeness and closeness. The completeness/closeness trade-off is measured as a function of user preferences. For example, depending on the resolution at which a user accesses the produced content, a user might prefer a small (zoom-in) or a large (zoom-out) viewpoint. The virtual director module also rates the viewpoint selected in each camera view according to the quality (in terms of user preferences) of its completeness/closeness trade-off, and to its degree of occlusions. Finally the virtual director module computes the parameters of an optimal virtual camera that pans, zooms and switches across views for the temporal segment at hand, to preserve high ratings of selected viewpoints while minimizing the amount of virtual camera movements.

Experiments that the viewpoints selected by the virtual director, in accordance with embodiments of the present invention, based on the above functions, match end-user expectations. Even more, subjective tests reveal that viewers generally prefer the viewpoints selected based on the automatic system than the ones selected by a human producer. This is partly explained by the severe load imposed to the human operator when the number of camera increases. Hence, the present invention also alleviates the bottleneck experienced by a human operator, when jointly and simultaneously processing a large number of source cameras.

BRIEF DESCRIPTION OF THE FIGURES

FIG. 1: hierarchical working flow
FIG. 2: hierarchical structure
FIG. 3: weighting function
FIG. 4: behaviour of viewpoint selection
FIG. 5: model of two-step estimation of viewpoint movement
FIG. 6: camera plans
FIG. 7: sample views from cameras
FIG. 8: short video clip
FIG. 9: viewpoint sequences
FIG. 10: behaviour of camera/viewpoint sequence
FIG. 11: comparison of camera and viewpoint sequences
FIG. 12: frames in generated sequences
FIG. 13: comparison of generated camera sequences
FIG. 14: 3 step embodiment, of the present invention
FIG. 16: use of masks for detection Further drawings are shown in appendix 2. These drawings refer to appendix 2 and the text of appendix 2 should be read in conjunction with these drawings and the references specific to this appendix.

DETAILED DESCRIPTION OF THE PRESENT INVENTION

Figure 15:
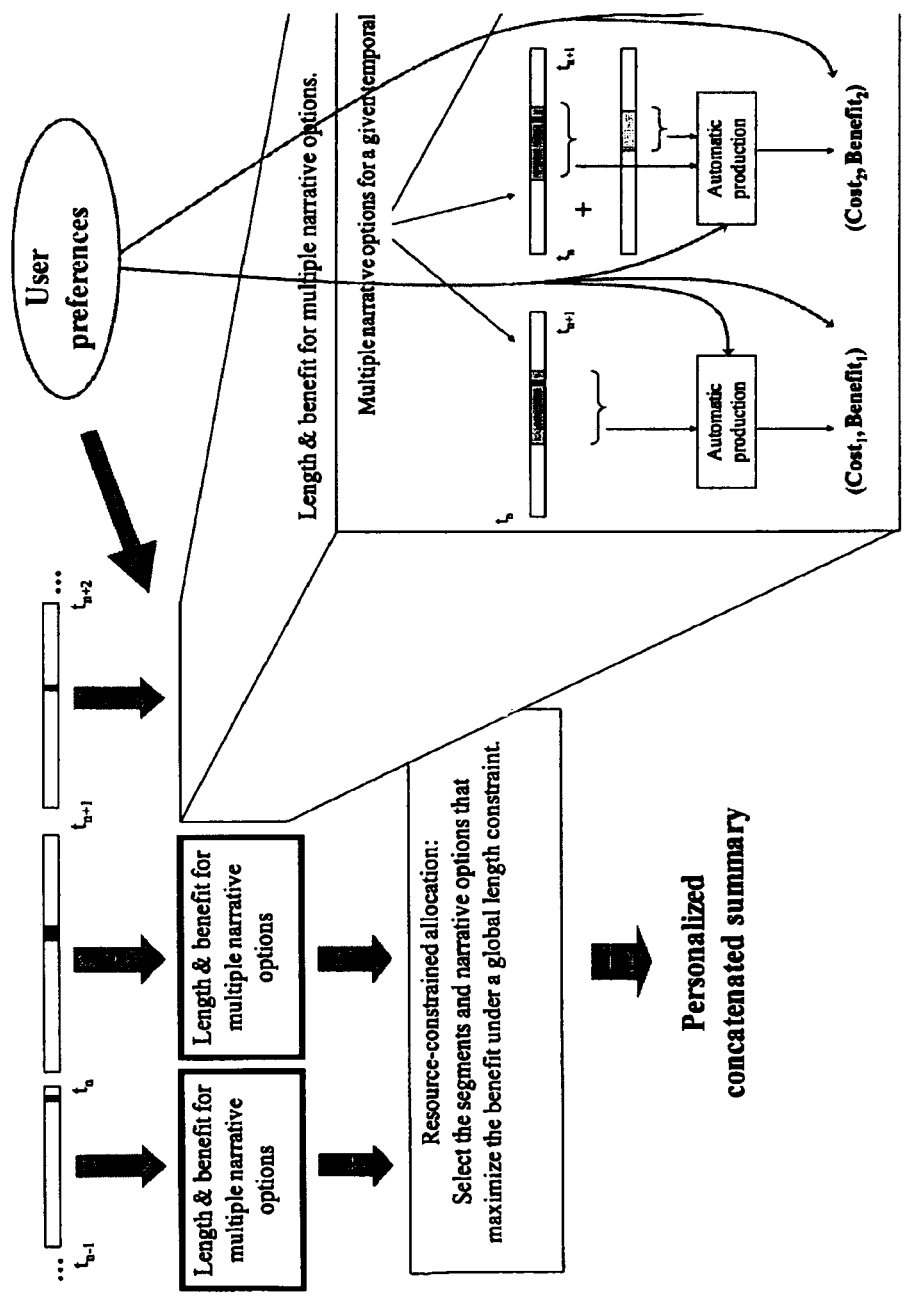
FIG. 15: divide and conquer embodiment of the present invention

The present invention provides computer based methods and systems for cost-effective and autonomous generation of video contents from multi-sensored data including automatic extraction of intelligent contents from a network of sensors distributed around the scene at hand. Here, intelligent contents refers to the identification of salient segments within the audiovisual content, using distributed scene analysis algorithms. This knowledge can be exploited to automate the production and personalize the summarization of video contents.

Without loss of generality and without limiting the present invention, only static cameras will mainly be described as an illustrative embodiment.

One input is the positions of objects of interest. To identify salient segments in the raw video content, multi-camera analysis is considered, whereby relevant object detection such as people detection methods relying on the fusion of the foreground likelihood information computed in each view can be used. Multi-view analysis can overcome traditional hurdles such as occlusions, shadows and changing illumination. This is in contrast with single sensor signal analysis, which is often subject to interpretation ambiguities, due to the lack of accurate model of the scene, and to coincidental adverse scene configurations.

In accordance with some embodiments of the present invention, the positions of the objects of interest are assumed to be (at least partially) known as a function of the time. For example, embodiments of the present invention infer this knowledge from the analysis of the light fields captured by a distributed set of static cameras. In such an embodiment a ground occupancy mask can be computed by merging the foreground likelihood measured in each view. Actual player positions can then be derived through an iterative and occlusion-aware greedy process. Multi view analysis can be used to provide the required inputs to the autonomous team sport production method and system of the present invention and is described in the article "Detection and Recognition of Sports (wo)men from Multiple Views", D. Delannay, N. Danhier, and C. De Vleeschouwer, *Third ACM/IEEE International Conference on Distributed Smart Cameras*, Como, Italy, September 2009 is incorporated herein by reference in its entirety as appendix 2.

Embodiments of the present invention then proceed in two stages.

In a first stage, given the positions of each object of interest with time, the invention selects a set of so-called relevant parameters to render the scene of interest as a function of time, using a camera located at a point which can be any arbitrary 3D point around the action.

Here, the rendering parameters define a field of view for the camera, and depend on the camera infrastructure that has been deployed to capture the images of the scene. For example, embodiments of the present invention make use of a fixed camera, and the rendering parameters define how to crop sub-images within the camera view. In other embodiments an articulated and motorized camera can be used, and the rendering parameters may then refer to the pan, tilt, and zoom parameters of the camera. The notion of relevant parameters has to do with the definition of informative, i.e. displaying the persons and objects of interest, and perceptually pleasant images.

In a second stage, embodiments of the present invention assume that multiple (PTZ) cameras are distributed around the scene, and how to select the right camera to render the action at a given time is then determined. This is done by selecting or promoting informative cameras, and avoiding perceptually inopportune switching between cameras.

Together the camera index and its field of view define the viewpoint to render the action.

To produce semantically meaningful and perceptually comfortable video summaries based on the extraction or interpolation of images from the raw content, the present invention introduces three fundamental concepts, i.e. "completeness", "smoothness" and closeness (or "fineness"), to abstract the semantic and narrative requirement of video contents. Based on those concepts, the selection of camera viewpoints and that of temporal segments in the summary can be determined, these two being independent optimization problems.

Completeness stands for both the integrity of view rendering in camera/viewpoint selection, and that of storytelling in summarization. A viewpoint of high completeness includes more salient objects, while a story of high completeness consists of more key actions.

Smoothness refers to the graceful displacement of the virtual camera viewpoint, and to the continuous story-telling resulting from the selection of contiguous temporal segments. Preserving smoothness is important to avoid distracting the viewer from the story by abrupt changes of viewpoints or constant temporal jumps (Owen, 2007).

Closeness or Fineness refers to the amount of details provided about the rendered action. Spatially, it favours close views. Temporally, it implies redundant story-telling, including replays. Increasing the fineness of a video does not only improve the viewing experience, but is also essential in guiding the emotional involvement of viewers by close-up shots.

In accordance with embodiments of the present invention these three concepts are optimised, e.g. maximized to produce a meaningful and visually pleasant content. In practice, maximization of the three concepts can result in conflicting decisions, under some limited resource constraints, typically expressed in terms of the spatial resolution and temporal duration of the produced content. For example, at fixed output video resolution, increasing completeness generally induces larger viewpoints, which in turns decreases fineness of salient objects. Similarly, increased smoothness of viewpoint movement prevents accurate pursuit of actions of interest along the time. The same observations hold regarding the selection of segments and the organization of stories along the time, under some global duration constraints.

Accordingly, embodiments of the present invention relating to computer based methods and systems provide a good balance between the three major factors. For example, quantitative metrics are defined to reflect completeness, fineness/closeness. Constrained optimization can then be used to balance those concepts.

In addition, for improved computational efficiency, both production and summarization are envisioned in the divide and conquer paradigm (see FIG. 15). This especially makes sense since video contents intrinsically have a hierarchical structure, starting from each frame, shots (set of consecutive frames created by similar camerawork), to semantic segments (consecutive shots logically related to the identical action), and ending with the overall sequence.

For example an event timeframe can be first cut into semantically meaningful temporal segments, such as an offense/defense round of team sports, or an entry in news. For each segment, several narrative options are considered. Each option defines a local story, which consists of multiple shots with different camera coverage. A local story not only includes shots to render the global action at hand, but also shots for explanative and decorative purposes, e.g., replays and close-up views in sports or graph data in news. Given the timestamps and the production strategy (close-up view, replay, etc) of the shots composing a narrative option, the camerawork associated to each shot is planned automatically, taking into account the knowledge inferred about the scene by video analysis modules.

Benefits and costs are then assigned to each local story. For example, the cost can simply corresponds to the duration of the summary. The benefit reflects user satisfaction (under some individual preferences), and measures how some general requirements, e.g., the continuity and completeness of the story, are fulfilled. These pairs of benefits and costs are then fed into a summarization engine, which solves a resource allocation problem to find the organization of local stories that achieves the highest benefit under the constrained summary length.

Camerawork Planning will be described with reference to an example, e.g. Team Sport Videos basketball video production. Whilst extendable to other contexts (e.g. PTZ camera control), the process has been designed to select which fraction of which camera view should be cropped in a distributed set of still cameras to render the scene at hand in a semantically meaningful and visually pleasant way by assuming the knowledge of players' positions.

Step 1: Camera-Wise Viewpoint Selection.

At each time instant and in each view, it is assumed that the players' supports are known, and select the cropping parameters that optimize the trade-off between completeness and fineness.

Formally, a viewpoint $v_{ki}$ in the $k^{th}$ camera view of the $i^{th}$ frame is defined by the size $S_{ki}$ and the center $c_{ki}$ of the window that is cropped in the $k^{th}$ view for actual display. It has to be selected to include the objects of interest, and provide a fine, i.e. high resolution, description of those objects. If there are N salient objects in this frame, and the location of the $n^{th}$ object in the $k^{th}$ view is denoted by $x_{nki}$, we select the optimal viewpoint $v_{ki}^*$, by maximizing a weighted sum of object interests as follows:

$$v_{ki}^* = \underset{\{S_{ki}, c_{ki}\}}{\mathrm{argmax}} \sum_{n=1}^{N} I_n \cdot \alpha(S_{ki}, u) \cdot m\left(\frac{\|x_{nki} - c_{ki}\|}{S_{ki}}\right)$$

In the above equation:

$I_n$ denotes the level of interest assigned to the $n^{th}$ object detected in the scene. Note that assigning distinct weights to team sport players allows focusing on a preferred player, but also implies recognition of each player. A unit weight can be assigned to all players, thereby producing a video that renders the global team sport action.

The vector u reflects the user constraints and preferences in terms of viewpoint resolution and camera view, $u = [u^{close}\ u^{res}\ \{u_k\}]$. In particular, its component $u^{res}$ defines the resolution of the output stream, which is generally constrained by the transmission bandwidth or end-user device resolution. Its component $u^{close}$ is set to a value larger than 1, and increases to favor close viewpoints compared to large zoom-out views. The other components of u are dealing with camera preferences, and are defined in the second step below.

The function $m(\ldots)$ modulates the weights of the objects according to their distance to the center of the viewpoint, compared to the size of this window. Intuitively, the weight should be high and positive when the object-of-interest is located in the center of the display window, and should be negative or zero when the object lies outside the viewing area. Many instances are appropriate, e.g. the well-known Mexican Hat function.

The function $\alpha(.)$ reflects the penalty induced by the fact that the native signal captured by the $k^{th}$ camera has to be sub-sampled once the size of the viewpoint becomes larger than the maximal resolution $u^{res}$ allowed by the user. This function typically decreases with $S_{ki}$. An appropriate choice consists in setting the function equal to one when $S_{ki} < u^{res}$, and in making it decrease afterwards. An example of $\alpha(.)$ is defined by:

$$\alpha(S_{ki}, u) = \left[\min\left(\frac{u^{res}}{S_{ki}}, 1\right)\right]^{u^{close}},$$

where $u^{close} > 1$ increases to favor close viewpoints compared to large zoom-out views.

Step 2: Frame-Wise Camera Selection

The viewpoint selected in each view is rated according to the quality of its completeness/closeness trade-off, and to its degree of occlusions. The highest rate should correspond to a view that (1) makes most object of interest visible, and (2) is close to the action, meaning that it presents important objects with lots of details, i.e. a high resolution.

Formally, given the interest $I_n$ of each player, the rate $I_{ki}(v_{ki}, u)$ associated to each camera view is defined as follows:

$$I_{ki}(v_{ki}, u) = u_k \cdot \sum_{n=1}^{N} I_n \cdot o_k(x_{nki} | \bar{x}) \cdot h_k(x_{nki}) \cdot \beta(S_{ki}, u) \cdot m\left(\frac{\|x_{nki} - c_{ki}\|}{S_{ki}}\right)$$

In the above equation:

$u_k$ denotes the weight assigned to the $k^{th}$ camera, while m, $\alpha$ and $\beta$ are defined as identified above.

$o_k(x_{nki} | \bar{x})$ measures the occlusion ratio of the $n^{th}$ object in camera view k, knowing the position of all other objects. The occlusion ratio of an object is defined to be the fraction of pixels of the object that are hidden by other objects when projected on the camera sensor.

The height $h_k(x_{nki})$ is defined to be the height in pixels of the projection in view k of a six feet tall vertical object located in $x_{nki}$. Six feet is the average height of the players. The value of $h_k(x_{nki})$ is directly computed based on camera calibration. When calibration is not available, it can be estimated based on the height of the object detected in view k.

Step 3: Smoothing of Camera/Viewpoint Sequences.

For the temporal segment at hand, the parameters of an optimal virtual camera that pans, zooms and switches across views are computed to preserve high ratings of selected viewpoints while minimizing the amount of virtual camera movements.

The smoothing process can be implemented based on the definition of two Markov Random Fields. At first, $\hat{v}_{ki}$ are taken as observed data on the $i^{th}$ image, and assume that they are noise-distorted outputs of some underlying smooth results $v_{ki}$. Given the smooth viewpoint sequence recovered for each camera, camera-gains $I_{ki}(v_{ki}, u)$ of those derived viewpoints are computed, and a smooth camera sequence from the second Markov field is inferred by making the probabilities $P(k|v_{ki}, u)$ of each camera proportional to the gains $I_{ki}(v_{ki}, u)$.

Compared to simple Gaussian smoothing filters, this enables adaptive smoothing by setting different smoothing strength on each individual frame. Furthermore, iterative slight smoothing in our method is able to achieve softer results than one-pass strong smoothing.

Multi-view Player Detection and Recognition are obtained in an autonomous production of visual content by relying on the detection (and recognition) of object-of-interest in the scene.

The foreground likelihood is computed independently on each view, using standard background modelling techniques. These likelihoods are then fused by projecting them on the ground plane, thereby defining a set of so-called ground occupancy masks. The computation of the ground occupancy mask associated to each view is efficient, and these masks are combined and processed to infer the actual position of players.

Formally, the computation of the ground occupancy mask $G_k$ associated to the $k^{th}$ view is described as follows. At a given time, the $k^{th}$ view is the source of a foreground likelihood image $F_k \in [0, 1]^{M_k}$, where $M_k$ is the number of pixels of camera k, $0 < k < C$. Due to the player verticality assumption, vertical line segments anchored in occupied positions on the ground plane support a part of the detected object, and thus back-project on foreground silhouettes in each camera view. Hence, to reflect ground occupancy in x, the value of $G_k$ in x is defined to be the integration of the (forward-) projection of $F_k$ on a vertical segment anchored in x. Obviously, this integration can equivalently be computed in $F_k$, along the back-projection of the vertical segment anchored in x. This is in contrast methods which compute the mask by aggregating the projections of the foreground likelihood on a set of planes that are parallel to the ground.

To speed up the computations associated to our formulation, it is observed that, through appropriate transformation of $F_k$, it is possible to shape the back-projected integration domain so that it also corresponds to a vertical segment in the transformed view, thereby making the computation of integrals particularly efficient through the principle of integral images. The transformation has been designed to address a double objective. First, points of the 3D space located on the same vertical line have to be projected on the same column in the transformed view (vertical vanishing point at infinity). Second, vertical objects that stand on the ground and whose feet are projected on the same horizontal line of the transformed view have to keep same projected heights ratios. Once the first property is met, the 3D points belonging to the vertical line standing above a given point from the ground plane simply project on the column of the transformed view that stands above the projection of the 3D ground plane point. Hence, $G_k(x)$ is simply computed as the integral of the transformed view over this vertical back-projected segment. Preservation of height along the lines of the transformed view even further simplifies computations.

For side views, these two properties can be achieved by virtually moving (through homography transforms) the camera viewing direction (principal axis) so as to bring the vertical vanishing point at infinity and ensure horizon line is horizontal. For top views, the principal axis is set perpendicular to the ground and a polar mapping is performed to achieve the same properties. Note that in some geometrical configurations, these transformations can induce severe skewing of the views.

Given the ground occupancy masks $G_k$ for all views, we now explain how to infer the position of the people standing on the ground. A priori, in a team sport context, we know that (i) each player induces a dense cluster on the sum of ground occupancy masks, and (ii) the number of people to detect is equal to a known value N, e.g. N=12 for basket-ball (10 players+2 referees).

For this reason, in each ground location x, we consider the sum of all projections—normalized by the number of views that actually cover x—, and look for the higher intensity spots in this aggregated ground occupancy mask. To locate those spots, we have first considered a naive greedy approach that is equivalent to an iterative matching pursuit procedure. At each step, the matching pursuit process maximizes the inner product between a translated Gaussian kernel, and the aggregated ground occupancy mask. The position of the kernel which induces the larger inner-product defines the player position. Before running the next iteration, the contribution of the Gaussian kernel is subtracted from the aggregated mask to produce a residual mask. The process iterates until sufficient players have been located.

This approach is simple, but suffers from many false detections at the intersection of the projections of distinct players silhouettes from different views. This is due to the fact that occlusions induce non-linearities in the definition of the ground occupancy mask. In other words, the ground occupancy mask of a group of players is not equal to the sum of ground occupancy masks projected by each individual player. Knowledge about the presence of some people on the ground field affects the informative value of the foreground masks in these locations. In particular, if the vertical line associated to a position x is occluded by/occludes another player whose presence is very likely, this particular view should not be exploited to decide whether there is a player in x or not.

A refinement involves initializing the process by defining $G_k^1(x) = G_k(x)$ to be the ground occupancy mask associated to the $k^{th}$ view, and set $w_k^1(x)$ to 1 when x is covered by the $k^{th}$ view, and to 0 otherwise.

Each iteration is then run in two steps. At iteration n, the first step searches for the most likely position of the $n^{th}$ player, knowing the position of the (n−1) players located in previous iterations. The second step updates the ground occupancy masks of all views to remove the contribution of the newly located player.

Formally, the first step of iteration n aggregates the ground occupancy mask from all views, and then searches for the denser cluster in this mask. Hence, it computes the aggregated mask as:

$$G^n(x) = \frac{\sum_{k=1}^{C} w_k^n(x) \cdot G_k^n(x)}{\sum_{k=1}^{C} w_k^n(x)},$$

and then defines the most likely position $x_n$ for the $n^{th}$ player by $$x_n = \underset{y}{\operatorname{argmax}} < G^n, \phi(y) >$$

where $\phi(y)$ denotes a Gaussian kernel centered in y, and whose spatial support corresponds to the typical width of a player.

In the second step, the ground occupancy mask of each view is updated to account for the presence of the $n^{th}$ player. In the ground position x, we consider that the typical support of a player silhouette in view k is a rectangular box of width W and height H, and observe that the part of the silhouette that occludes or is occluded by the newly detected player does not bring any information about the potential presence of a player in position x. The fraction $\phi_k(x, x_n)$ of the silhouette in ground position x that becomes non-informative in the $k^{th}$ view is estimated, as a consequence of the presence of a player in $x_n$. It is then proposed to update the ground occupancy mask and aggregation weight of the $k^{th}$ camera in position x as follows:

$$G_k^{n+1}(x)=\max(0,G_k^n(x)-\phi_k(x,x_n)\cdot G_k^1(x_n)),$$

$$w_k^{n+1}(x)=\max(0,w_k^n(x)-\phi_k(x,x_n)).$$

For improved computational efficiency, the positions x investigated in the refined approach are limited to the 30 local maxima that have been detected by the naive approach.

For completeness, it is noted that the above described update procedure omit the potential interference between occlusions caused by distinct players in the same view. However, the consequence of this approximation is far from being dramatic, since it ends up in omitting part of the information that was meaningful to assess the occupancy in occluded positions, without affecting the information that is actually exploited. Taking those interferences into account would require to back-project the player silhouettes in each view, thereby tending towards a computationally and memory expensive approach. The method and system of the present invention does not suffer from the usual weaknesses of greedy algorithms, such as a tendency to get caught in bad local minima.

The main technical benefits of the present invention include at least one or a combination of:

- The capability to crop appropriate pixels in the image memory and/or control a motorized PTZ, so as to render a team action, i.e. an action involving multiple moving objects/persons of interest, from an arbitrary 3D point.
- The ability to (i) control field of view selection by individual camera, and (ii) select a best camera within a set of camera. Such ability makes it possible to handle a potentially very large number of cameras simultaneously. This is especially true since the rendering parameters selection for a particular camera can be computed independently of other cameras.
- The possibility to reproduce and thus technically personalize the viewpoint selection process according to individual user preferences. For example, in the context of a sport event, coaches (who prefer large viewpoints showing the entire game) have different expectations regarding viewpoint selection than common spectator (who prefer closer and emotionally richer images). Thus these preferences are directly related to technical parameters of how the cameras are controlled. Automating the production process provides a technical solution to what amounts to answering individual requests.

The present invention includes within its scope further improvements. The present invention includes other criteria for computationally efficient and/or analytically solvable selection of viewpoints. It also includes better representation for salient objects such as using moving particles or flexible body models instead of simple bounding boxes. Furthermore, the selection and smoothing of viewpoints and cameras into four sub-steps in the current version simplifies the formulation. However, they can be solved in a unified estimation because their results affect each other. The present invention also includes other selection criteria of viewpoint and cameras independent of subjective evaluations.

Exploitation of a distributed network of cameras to approximate the images that would be captured by a virtual sensor located in an arbitrary position, with arbitrary viewpoint coverage can be used with any of the embodiments of the present invention. The present invention can be used with these works, because in accordance with the present invention a selection is made of the most appropriate viewpoint within a set/space of candidate viewpoints. Hence, the addition of free-viewpoint rendering algorithms to embodiments of the present invention just contributes to enlarge the set of potential candidates.

The methods and system of the present invention can be implemented on a computing system which can be utilized with the methods and in a system according to the present invention including computer programs. A computer may include a video display terminal, a data input means such as a keyboard, and a graphic user interface indicating means such as a mouse. Computer may be implemented as a general purpose computer, e.g. a UNIX workstation or a personal computer.

Typically, the computer includes a Central Processing Unit ("CPU"), such as a conventional microprocessor of which a Pentium processor supplied by Intel Corp. USA is only an example, and a number of other units interconnected via bus system. The bus system may be any suitable bus system. The computer includes at least one memory. Memory may include any of a variety of data storage devices known to the skilled person such as random-access memory ("RAM"), read-only memory ("ROM"), non-volatile read/write memory such as a hard disc as known to the skilled person. For example, computer may further include random-access memory ("RAM"), read-only memory ("ROM"), as well as a display adapter for connecting system bus to a video display terminal, and an optional input/output (I/O) adapter for connecting peripheral devices (e.g., disk and tape drives) to system bus. The video display terminal can be the visual output of computer, which can be any suitable display device such as a CRT-based video display well-known in the art of computer hardware. However, with a desk-top computer, a portable or a notebook-based computer, video display terminal can be replaced with a LCD-based or a gas plasma-based flat-panel display. Computer further includes user an interface adapter for connecting a keyboard, mouse, optional speaker. The relevant video required may be input directly into the computer via a video ore graphics interface or from storage devices, after which a processor carries out a method in accordance with the present invention. The relevant video data may be provided on a suitable signal storage medium such as a diskette, a replaceable hard disc, an optical storage device such as a CD-ROM or DVD-ROM, a magnetic tape or similar. The results of the method may be transmitted to a further near or remote location. A communications adapter may connect the computer to a data network such as the Internet, an Intranet a Local or Wide Area network (LAN or WAN) or a CAN.

The computer also includes a graphical user interface that resides within machine-readable media to direct the operation of the computer. Any suitable machine-readable media may retain the graphical user interface, such as a random access memory (RAM), a read-only memory (ROM), a magnetic diskette, magnetic tape, or optical disk (the last three being located in disk and tape drives). Any suitable operating system and associated graphical user interface (e.g., Microsoft Windows, Linux) may direct the CPU. In addition, the computer includes a control program that resides within computer memory storage. The control program contains instructions that when executed on the CPU allow the computer to carry out the operations described with respect to any of the methods of the present invention.

The present invention also provides a computer program product for carrying out the method of the present invention and this can reside in any suitable memory. However, it is important that while the present invention has been, and will continue to be, that those skilled in the art will appreciate that the mechanisms of the present invention are capable of being distributed as a computer program product in a variety of forms, and that the present invention applies equally regardless of the particular type of signal bearing media used to actually carry out the distribution. Examples of computer readable signal bearing media include: recordable type media such as floppy disks and CD ROMs and transmission type media such as digital and analogue communication links. Accordingly, the present invention also includes a software product which when executed on a suitable computing device carries out any of the methods of the present invention. Suitable software can be obtained by programming in a suitable high level language such as C and compiling on a suitable compiler for the target computer processor or in an interpreted language such as Java and then compiled on a suitable compiler for implementation with the Java Virtual Machine.

The present invention provides software, e.g. a computer program having code segments that provide a program that, when executed on a processing engine, provides a virtual director module. The software may include code segments that provide, when executed on the processing engine: any of the methods of the present invention or implement any of the system means of the present invention.

Other aspects and advantages of the present invention as well as a more complete understanding thereof will become apparent from the following description taken in conjunction with the embedded and accompanying figures, illustrating by way of example the principles of the invention. Moreover, it is intended that the scope of the invention be determined by the adjoining claims and not by the preceding summary or the following detailed description.

Appendix 1

1. Introduction

Targeting the producing of semantically meaningful and perceptually comfortable contents from raw multi-sensored data, we propose a computationally efficient production system, based on the divide-and-conquer paradigm. We summarize major factors of our target by three keywords, which are "completeness", "closeness" and "smoothness". Completeness stands for the integrity of view rendering. Closeness defines the fineness of detail description, and smoothness is a term referring to the continuity of both viewpoint movement and story telling. By trading off among those factors, we develop methods for selecting optimal viewpoints and cameras to fit the display resolution and other user preferences, and for smoothing these sequences for a continuous and graceful story-telling. There are a long list of possible user-preferences, such as user's profile, user's browsing history, and device capabilities. We summarize narrative preferences into four descriptors, i.e., user preferred team, user preferred player, user preferred event, and user preferred camera. All device constraints, such as display resolution, network speed, decoder's performance, are abstracted as the preferred display resolution. We thus mainly discuss user preferences with these five elements in the present work.

The capability to take those preferences into account obviously depends on the knowledge captured about the scene through video analysis tools, e.g., detecting which team is offending or defending. However and more importantly, it is worth mentioning that our framework is generic in that it can include any kind of user preferences.

In Section 2, we explain the estimation framework of both selection and smoothing of viewpoints and camera views, and give their detailed formulation and implementation. In Section 3, more technical details are given and experiments are made to verify the efficiency of our system. Finally, we conclude this work and list a number of possible paths for future research.

Appendix 1

2. Autonomous Production of Personalized Basketball Videos from Multi-sensored Data Although it is difficult to define an absolute rule to evaluate the performance of organized stories and determined viewpoints in presenting a generic scenario, production of sport videos has some general principles. [11] For basketball games, we summarize these rules into three major trade-offs.

The first trade-off arises from the personalization of the production. Specifically, it originates from the conflict between preserving general production rules of sports videos and maximizing satisfaction of user preferences. Some basic rules of video production for basketball games could not be sacrificed for better satisfaction of user preferences, e.g., the scene must always include the ball, and well balanced weighting should be taken between the dominant player and the user-preferred player when rendering an event.

The second trade-off is the balance between completeness and closeness of the rendered scene. The intrinsic interest of basketball games partially comes from the complexity of team working, whose clear description requires spatial completeness in camera coverage. However, many highlighted activities usually happen in a specific and bounded playing area. A close view emphasizing those areas increases the emotional involvement of the audience with the play, by moving the audience closer to the scene. Closeness is also required to generate a view of the game with sufficient spatial resolution under a situation with limited resources, such as small display size or limited bandwidth resources of handheld devices.

The final trade-off balances accurate pursuit of actions of interest along the time, and smoothness of viewpoint movement. The need for the audience to know the general situation regarding the game throughout the contest is a primary requirement and main purpose of viewpoint switching. When we mix angles of different cameras for highlighting or other special effects, smoothness of camera switching should be kept in mind to help the audience to rapidly re-orient the play situation after viewpoint movements.[11]

Given the meta-data gathered from multi-sensor video data, we plan viewpoint coverage and camera switching by considering the above three trade-offs. We give an overview of our production framework in section 2.1, and introduce some notations on meta-data in section 2.2. In section 2.3, we propose our criteria for selecting viewpoint and camera on an individual frame. Smoothing of viewpoint and camera sequences is explained in section 2.4.

Appendix 1

2.1. Overview of the Production Framework

It is unavoidable to bring discontinuity to story-telling contents when switching camera views. In order to suppress the influence of this discontinuity, we usually locate dramatic viewpoint or camera switching during the gap between two highlighted events, to avoid possible distraction of the audience from the story. Hence, we can envision our personalized production in the divide and conquer paradigm, as shown in Fig.1. The whole story is first divided into several segments. Optimal viewpoints and cameras are determined locally within each segment by trading off between benefits and costs under specified user-preferences. Furthermore, estimation of optimal camera or viewpoints is performed in a hierarchical structure. The estimation phase takes bottom-up steps from all individual frames to the whole story. Starting from a standalone frame, we optimize the viewpoint in each individual camera view, determine the best camera view from multiple candidate cameras under the selected viewpoints, and finally organize the whole story. When we need to render the story to the audience, a top-down processing is taken, which first divide the video into non-overlapped segments. Corresponding frames for each segment are then picked up, and are displayed on the target device with specified cameras and viewpoints.

Intrinsic hierarchical structure of basketball games provides reasonable grounds for the above vision, and also gives clues on segment separation. As shown in Fig.2, a game is divided by rules into a sequence of non-overlapped Appendix 1 ball-possession periods. A ball-possession period is the period of game when the same team holds the ball and makes several trials of scoring. Within each period, several events might occur during the offence/defence process. According to whether the event is related to the 24-second shot clock, events in a basketball game could be classified as clock-events and non-clock-events. Clock-events will not overlap with each other, while non-clock-events might overlap with both clock-/non-clock- events. In general, one ball possession period is a rather fluent period and requires the period-level continuity of viewpoint movement.

In this paper, we first define the criteria for evaluating viewpoints and cameras on each individual frame. Camera-wise smoothness of viewpoints is then applied to all frames within each ball possession period. Based on determined viewpoints, a camera sequence is selected and smoothed.

*2.2. Meta-data and User Preference*

Input data fed into our system include video data, associated meta-data, and user preferences. Let's assume that we have gathered a database of basketball video sequences, which are captured simultaneously by $K$ different cameras. All cameras are loosely synchronized and produce the same number of frames, i.e., $N$ frames, for each camera. On the $i$-th frame captured at time $t_i$, $M_i$ different salient objects, denoted by $\{o_{im}|m = 1, \cdots, M_i\}$, are detected in total from all camera views. We have two kinds of salient objects defined. The first class includes regions for players, referees, and the ball, which are used for scene understanding. The second class includes the basket, coach bench, and some landmarks of the court, which are used in both scene understanding and camera calibration. Objects of the first class are automatically extracted from the scene typically based on background subtraction algorithm, while those from the second class are manually labeled

Appendix 1 because their positions are constant on fixed cameras. We define the $m$-th salient object as $o_{im} = [o_{kim}|k = 1\cdots K]$, where $o_{kim}$ is the $m$-th salient object in the $k$-th camera.

All salient objects are represented by regions of interest. A region $r$ is a set of pixel coordinates that are belonging to this region. If $o_{im}$ does not appear in the $k$-th camera view, we set $o_{kim}$ to the empty set $\phi$. With $r_1$ and $r_2$ being two arbitrary regions, we first define several elemental functions on one or two regions as $$\text{Area}: \mathcal{A}(r_1) = \sum_{x \in r_1} 1; \tag{1}$$

$$\text{Center}: \mathcal{C}(r_1) = \frac{1}{\mathcal{A}(r_1)} \sum_{x \in r_1} x; \tag{2}$$

$$\text{Visibility}: \mathcal{V}(r_1|r_2) = \begin{cases} 1, & r_1 \subseteq r_2 \\ -1, & otherwise; \end{cases} \tag{3}$$

$$\text{Distance}: \mathcal{D}(r_1, r_2) = \|\mathcal{C}(r_1) - \mathcal{C}(r_2)\|; \tag{4}$$

which will be used in our later sections.

Furthermore, we define user preference by a parameter set $u$, which includes both narrative and restrictive preferences, such as favorites and device capabilities.

2.3. Selection of Camera and Viewpoints on Individual Frames

For simplicity, we put aside the smoothing problem in the first step, and start by considering the selection of a proper viewpoint on each standalone frame. We use the following two subsections to explain our solution to this problem from two aspects, i.e., evaluation of various viewpoints on the same camera view and evaluation of different camera views.

2.3.1. Computation of Optimal Viewpoints in Each Individual Camera

Although evaluation of viewpoint is a highly subjective task that still lacks an objective rule, we have some basic requirements on our viewpoint selection. It should be computational efficient, and should be adaptable under different device resolutions. For a device with high display resolution, we usually prefer a complete view of the whole scene. When the resolution is Appendix 1 limited due to device or channel constraints, we have to sacrifice part of the scene for improved representation of local details. For an object just next to the viewpoint border, it should be included to improve overall completeness of story-telling if it shows high relevance to the current event in later frames, and it should be excluded to prevent the viewpoint sequence from oscillating if it always appears around the border. In order to keep a safe area to deal with this kind of object, we prefer that visible salient objects inside the determined viewpoint are closer to the center while invisible objects should be driven away from the border of viewpoint, as far as possible.

We let the viewpoint for scene construction in the $i$-th frame of the $k$-th camera be $\mathbf{v}_{ki}$. Viewpoint $\mathbf{v}_{ki}$ is defined as a rectangular region. For natural representation of the scene, we limit the aspect ratio of all viewpoints to be the same aspect ratio of the display device. Therefore, for each $\mathbf{v}_{ki}$, we have only three free parameters, i.e., the horizontal center $v_{kix}$, the horizontal center $v_{kiy}$, and the width $v_{kiw}$, to tune. Individual optimal viewpoint is obtained by maximizing the interest gain of applying viewpoint $\mathbf{v}_{ki}$ to the $i$-th frame of the $k$-th camera, which is defined as a weighted sum of attentional interests from all visible salient objects in that frame, i.e., $$\mathcal{I}_{ki}(\mathbf{v}_{ki}|\mathbf{u}) = \sum_m w_{kim}(\mathbf{v}_{ki},\mathbf{u})\mathcal{I}(\mathbf{o}_{kim}|\mathbf{u}), \qquad (5)$$

where $\mathcal{I}(\mathbf{o}_{kim}|\mathbf{u})$ is the interest of a salient object $\mathbf{o}_{kim}$ under user Preference $\mathbf{u}$. In the present paper, pre-defined interest function $\mathcal{I}(\mathbf{o}_{kim}|\mathbf{u})$ will give different weighting according to different values of $\mathbf{u}$, which reflects narrative user preferences. For instance, a player specified by the audience is assigned a higher interest than a player not specified, and the ball is given the highest interest so that it is always included in the scene. We will explain a practical setting of $\mathcal{I}(\mathbf{o}_{kim}|\mathbf{u})$ with more details in the next section.

We define $w_{kim}(\mathbf{v}_{ki},\mathbf{u})$ to weight the attentional significance of a single object within a viewpoint. Mathematically, we take $w_{kim}(\mathbf{v}_{ki},\mathbf{u})$ in a form as follows, $$w_{kim}(\mathbf{v}_{ki},\mathbf{u}) = \frac{\mathcal{V}(\mathbf{o}_{kim}|\mathbf{v}_{ki})}{\ln \mathcal{A}(\mathbf{v}_{ki})} \exp\left[-\frac{\mathcal{D}(\mathbf{o}_{kim},\mathbf{v}_{ki})^2}{2[u^{\text{DEV}}]^2}\right], \qquad (6)$$

where we use $u^{\text{DEV}}$ to denote limitation of current device resolution in user preference $\mathbf{u}$. Our definition of $w_{kim}(\mathbf{v}_{ki},\mathbf{u})$ consists of three major parts: the exponential part which controls the concentrating strength of salient objects around the center according to the pixel resolution of device display; the

Appendix 1 zero-crossing part $\mathcal{V}(\mathbf{o}_{kim}|\mathbf{v}_{ki})$ which separates positive interests from negative interests at the border of viewpoint; and the appended fraction part $\ln \mathcal{A}(\mathbf{v}_{ki})$ which calculates the density of interests to evaluate the closeness and is set as a logarithm function. Note that $\mathcal{V}(\mathbf{o}_{kim}|\mathbf{v}_{ki})$ is positive only when salient object $\mathbf{o}_{kim}$ is fully contained inside viewpoint $\mathbf{v}_{ki}$, which shows the tendency of keeping a salient object intact in viewpoint selection. As shown in Fig.3, the basic idea of our definition is to change the relative importance of completeness and closeness by tuning the sharpness of central peak and modifying the length of tails. When $u^{DEV}$ is small, the exponential part decays quite fast, which tends to emphasize objects closer to the center and ignore objects outside the viewpoint. When $u^{DEV}$ gets larger, penalties for invisible objects are increased, which is on incentive to be complete and to display all salient objects. Therefore, $\mathcal{I}_{ki}(\mathbf{v}_{ki}|\mathbf{u})$ describes the trade-off between completeness (displaying as much objects as possible) and fineness (rendering the objects with a higher resolution) of scene description in individual frames.

A viewpoint that maximizes $\mathcal{I}_{ki}(\mathbf{v}_{ki}|\mathbf{u})$ drives visible objects closer to the center and leads to greater separations of invisible objects from the center. We let $\widehat{\mathbf{v}}_{ki}$ be the optimal viewpoint computed individually for each frame, i.e., $$\widehat{\mathbf{v}}_{ki} = \arg\max_{\mathbf{v}_{ki}} \; \mathcal{I}_{ki}(\mathbf{v}_{ki}|\mathbf{u}). \qquad (7)$$

Appendix 1

Some examples of optimal $\hat{v}_{ki}$ under different display resolution are given in Fig.4.

2.3.2. Selection of Camera Views for a Given Frame

Although we use data from multiple sensors, what really matters is not the number of sensors or their positioning, but the way we utilize those viewpoints to produce a unified virtual viewpoint which takes a good balance between local emphasis of details and global overview of scenarios. Since it is difficult to generate high-quality free viewpoint videos with the state-of-art methods, we only consider selecting a camera view from all presented cameras in the present work to make our system more generic. We define $c = \{c_i\}$ as a camera sequence, where $c_i$ denotes the camera index for the $i$-th frame. A trivial understanding in evaluating a camera view is that all salient objects should be clearly rendered with few occlusions and high resolution. For the $i$-th frame in the $k$-th camera, we define occlusion rate of salient objects as the normalized ratio of the united area of salient objects with respect to the sum of their individual area, i.e., $$\mathcal{R}_{ki}^{OC}(\mathbf{v}_{ki}) = \frac{\mathcal{N}_{ki}(\mathbf{v}_{ki})}{\mathcal{N}_{ki}(\mathbf{v}_{ki}) - 1} \left\{ 1 - \frac{\mathcal{A}\left[\bigcup_m (\mathbf{o}_{kim} \cap \mathbf{v}_{ki})\right]}{\sum_m \mathcal{A}[\mathbf{o}_{kim} \cap \mathbf{v}_{ki}]} \right\}$$

where $\bigcup_m x_m$ calculates the union of all bounding boxes $\{x_m\}$. We use $\mathcal{N}_{ki}(\mathbf{v}_{ki}) = \sum_{m, \mathbf{o}_{kim} \cap \mathbf{v}_{ki} \neq \phi} 1$ to represent the number of visible objects inside viewpoint $\mathbf{v}_{ci}$. To normalize the occlusion ratio against various numbers of salient objects in different frames, we rescale $\mathcal{R}_{ki}^{OC}(\mathbf{v}_{ki})$ into the range of 0 to 1 by applying $\mathcal{N}_{ki}(\mathbf{v}_{ki})/(\mathcal{N}_{ki}(\mathbf{v}_{ki}) - 1)$. We define the closeness of salient Appendix 1 objects as average pixel areas used for rendering objects, i.e., $$\mathcal{R}^{CL}_{ki}(\mathbf{v}_{ki}) = \log \frac{1}{\mathcal{N}_{ki}(\mathbf{v}_{ki})} \sum_m \mathcal{A}\,[\mathbf{o}_{kim} \cap \mathbf{v}_{ki}]. \qquad (8)$$

Also we define the completeness of this camera view as the percentage of included salient objects, i.e., $$\mathcal{R}^{CP}_{ki}(\mathbf{v}_{ki}, \mathbf{u}) = \frac{1}{\sum_m \mathcal{I}(\mathbf{o}_{kim}|\mathbf{u})} \sum_{\substack{m \\ \mathbf{o}_{cim} \cap \mathbf{v}_{ci} \neq \phi}} \mathcal{I}(\mathbf{o}_{kim}|\mathbf{u}). \qquad (9)$$

Accordingly, the interest gain of choosing the $k$-th camera for the $i$-th frame is evaluated by $\mathcal{I}_i(k|\mathbf{v}_{ki}, \mathbf{u})$, which reads, $$\mathcal{I}_i(k|\mathbf{v}_{ki}, \mathbf{u}) = w_k(\mathbf{u})\mathcal{R}^{CL}_{ki}(\mathbf{v}_{ki})\mathcal{R}^{CP}_{ki}(\mathbf{v}_{ki}, \mathbf{u}) \exp[-\frac{\mathcal{R}^{OC}_{ki}(\mathbf{v}_{ki})^2}{2}]. \qquad (10)$$

We weights the support of current user-preference to camera $k$ by $w_k(\mathbf{u})$, which assigns a higher value to camera $k$ if it is specified by the user and assigns a lower value if it is not specified. We then define the probability of taking the $k$-th camera for the $i$-th frame under $\{\mathbf{v}_{ki}\}$ as $$P(c_i = k|\mathbf{v}_{ki}, \mathbf{u}) \equiv \frac{\mathcal{I}_i(k|\mathbf{v}_{ki}, \mathbf{u})}{\sum_j \mathcal{I}_i(j|\mathbf{v}_{ki}, \mathbf{u})} \qquad (11)$$

*2.4. Generation of Smooth Viewpoint/Camera Sequences*

A video sequence with individually optimized viewpoints will have obvious fluctuations, which leads to uncomfortable visual artifacts. We solve this problem by generating a smooth moving sequence of both cameras and viewpoints based on their individual optima. We use a graph in Fig.5 to explain this estimation procedure, which covers two steps of the whole system, i.e., camera-wise smoothing of viewpoint movements and generation of a smooth camera sequence based on determined viewpoints. At first, we take $\hat{\mathbf{v}}_{ki}$ as observed data and assume that they are noise-distorted outputs of some underlying smooth results $\mathbf{v}_{ki}$. We use statistical inference to recover one smooth viewpoint sequence for each camera. Taking camera-gains of those derived viewpoints into consideration, we then generate a smooth camera sequence.

Appendix 1

2.4.1. Camera-wise Smoothing of Viewpoint Movement

We start from the smoothness of viewpoint movement on a video from the same camera. There are two contradictory strengths that drive the optimization of viewpoint movement: on one hand, optimized viewpoints should be closer to the optimal viewpoint of each individual frame; on the other hand, inter-frame smoothness of viewpoints prevents dramatic switching from occurring. Accordingly, we model smooth viewpoint movement as a Gaussian Markov Random Field (MRF), where the camera-wise smoothness is modeled as the priori of viewpoint configuration, i.e., $$P(\{v_{ki}\}|u) = \frac{\exp(-\frac{1}{2}\sum_i \sum_{j \in \mathcal{N}_i} \mathcal{H}^{\text{PRI}})}{\sum_{\{v_{ki}\}} \exp(-\frac{1}{2}\sum_i \sum_{j \in \mathcal{N}_i} \mathcal{H}^{\text{PRI}})}, \quad (12)$$

$$\mathcal{H}_{ij}^{\text{PRI}} = \frac{(v_{kix} - v_{kjx})^2}{2\sigma_{1x}^2} + \frac{(v_{kiy} - v_{kjy})^2}{2\sigma_{1y}^2} + \frac{(v_{kiw} - v_{kjw})^2}{2\sigma_{1w}^2}, \quad (13)$$

where $\mathcal{N}_i$ is the neighborhood of the $i$-th frame, while a conditional distribution $$P(\{\widehat{v}_{ki}\}|u, \{v_{ki}\}) = \prod_i \frac{\exp(-\mathcal{H}_i^{\text{LL}})}{\sum_{v_{ki}} \exp(-\mathcal{H}_i^{\text{LL}})} \quad (14)$$

$$\mathcal{H}_i^{\text{LL}} = \frac{(v_{kix} - \widehat{v}_{kix})^2}{2\beta_{ki}\sigma_{2x}^2} + \frac{(v_{kiy} - \widehat{v}_{kiy})^2}{2\beta_{ki}\sigma_{2y}^2} + \frac{(v_{kiw} - \widehat{v}_{kiw})^2}{2\beta_{ki}\sigma_{2w}^2} \quad (15)$$

describes the noise that produces the final results. We add a parameter $\beta_{ki}$ to control the flexibility of current frame in smoothing. A smaller $\beta_{ki}$ can be set to increase the tendency of current frame in approaching its locally optimal

Appendix 1 viewpoint. Estimation of optimal viewpoints $\{v_{ki}\}$ is done by maximizing the posterior probability of $\{v_{ki}\}$ over observed $\{\hat{v}_{ki}\}$, i.e., $P(\{v_{ki}\}|u, \{\hat{v}_{ki}\})$, which is expressed by a Gibbs canonical distribution [12], i.e., $$P(\{\mathbf{v}_{ki}\}|\mathbf{u}, \{\hat{\mathbf{v}}_{ki}\}) = \frac{\exp\{-\mathcal{H}^V\}}{\sum_{\{\mathbf{v}_{ki}\}} \exp\{-\mathcal{H}^V\}} \qquad (16)$$

with $$\mathcal{H}^V = \frac{1}{2}\sum_i \sum_{j \in \mathcal{N}_i} \mathcal{H}^{PRI} + \sum_i \mathcal{H}_i^{LL}. \qquad (17)$$

In statistical physics, the optimal configuration of largest posterior probability is determined by minimizing the following free energy [13]:

$$\mathcal{F}^V = \langle \mathcal{H}^V \rangle - \langle \ln P(\{\mathbf{v}_{ki}\}|\mathbf{u}, \{\hat{\mathbf{v}}_{ki}\}) \rangle \qquad (18)$$

where $\langle x \rangle = \sum_{\{\mathbf{v}_{ki}\}} x P(\{\mathbf{v}_{ki}\}|\mathbf{u}, \{\hat{\mathbf{v}}_{ki}\})$ is the expectation value of a quantity $x$. We then form the following criterion by considering the normalization constraint of $P(\{\mathbf{v}_{ki}\}|\mathbf{u}, \{\hat{\mathbf{v}}_{ki}\})$ as $$\mathcal{L}^V = \mathcal{F}^V + \eta(1 - \sum_{\{\mathbf{v}_{ki}\}} P(\{\mathbf{v}_{ki}\}|\mathbf{u}, \{\hat{\mathbf{v}}_{ki}\})) \qquad (19)$$

where $\eta$ is a Lagrangian multiplier. We use the Mean-field approximation [13] which assumes that $P(\{\mathbf{v}_{ki}\}|\mathbf{u}, \{\hat{\mathbf{v}}_{ki}\}) \approx \prod_i P(\mathbf{v}_{ki}|\mathbf{u}, \{\hat{\mathbf{v}}_{ki}\})$ to decouple two-body correlations. By taking differential of $\mathcal{L}^{VP}$ with respect to $P(v_{kix}|\mathbf{u}, \{\hat{\mathbf{v}}_{ki}\})$ and setting it to zero, we obtain the optimal estimation for $P(v_{kix}|\mathbf{u}, \{\hat{\mathbf{v}}_{ki}\})$ as $$0 = \frac{\partial \mathcal{L}^{VP}}{\partial P(v_{kix}|\mathbf{u}, \{\hat{\mathbf{v}}_{ki}\})}$$
$$= \sum_{j \in \mathcal{N}_i} \frac{v_{kix}^2 - 2v_{kix}\langle v_{kjx}\rangle^T}{2\sigma_{1x}^2} + \frac{(v_{kix} - \hat{v}_{kix})^2}{2\beta_{ki}\sigma_{2x}^2} + \ln P(v_{kix}|\mathbf{u}, \{\hat{\mathbf{v}}_{ki}\}) - \eta. \quad (20)$$

Therefore, we have posterior probability $$P(v_{kix}|\mathbf{u}, \{\hat{\mathbf{v}}_{ki}\}) \propto \exp\left\{-\sum_{j \in \mathcal{N}_i} \frac{(v_{kix} - \langle v_{kjx}\rangle)^2}{2\sigma_{1x}^2} - \frac{(v_{kix} - \hat{v}_{kix})^2}{2\beta_{ki}\sigma_{2x}^2}\right\}. \quad (21)$$

Appendix 1

Since it is a Gaussian distribution whose mean value has the maximized probability, the optimal viewpoint for $v_{kix}$ is solved as $$v_{kix}^* = \langle v_{kix} \rangle = \frac{\sum_{j \in \mathcal{N}_i} \sigma_{2x}^2 \beta_{ki} \langle v_{kjx} \rangle + \widehat{v}_{kix} \sigma_{1x}^2}{\sum_{j \in \mathcal{N}_i} \sigma_{2x}^2 \beta_{ki} + \sigma_{1x}^2}, \tag{22}$$

$$v_{kiy}^* = \langle v_{kiy} \rangle = \frac{\sum_{j \in \mathcal{N}_i} \sigma_{2y}^2 \beta_{ki} \langle v_{kjy} \rangle + \widehat{v}_{kiy} \sigma_{1y}^2}{\sum_{j \in \mathcal{N}_i} \sigma_{2y}^2 \beta_{ki} + \sigma_{1y}^2}, \tag{23}$$

$$v_{kiw}^* = \langle v_{kiw} \rangle = \frac{\sum_{j \in \mathcal{N}_i} \sigma_{2w}^2 \beta_{ki} \langle v_{kjw} \rangle + \widehat{v}_{kiw} \sigma_{1w}^2}{\sum_{j \in \mathcal{N}_i} \sigma_{2w}^2 \beta_{ki} + \sigma_{1w}^2} \tag{24}$$

with optimal results for $v_{kiy}$ and $v_{kiw}$ also given by similar derivation. We use $\mathbf{v}_{ki}^*$ in following sections to denote the optimal viewpoint represented by $v_{kix}^*$, $v_{kiy}^*$, and $v_{kiw}^*$.

2.4.2. Smoothing of Camera Sequence

A smooth camera sequence will be generated from determined viewpoints. For simplicity, we use $\rho_{ki} \equiv \log P(c_i = k | \mathbf{v}_{ki}^*, \mathbf{u})$ to shorten the formulation, which is computed by using Eq.11. We have to trade-off between minimizing camera-switching and maximizing the overall gain of cameras. We use another MRF to model these two kinds of strengths. The smoothness of camera sequence is modelled by a Gibbs canonical distribution, which reads, $$P(\{c_i\} | \{\mathbf{v}_{ki}^*\}, \mathbf{u}) = \frac{\exp(-\mathcal{H}^C)}{\sum_{\{c_i\}} \exp(-\mathcal{H}^C)}, \tag{25}$$

with $$\mathcal{H}^C = -\gamma \sum_{i,k} \delta_{c_i,k} \rho_{ki} - \frac{(1-\gamma)}{2} \sum_i \sum_{j \in \mathcal{N}_i} \alpha_{ij} \delta_{c_i,c_j}. \tag{26}$$

where $\alpha_{ij}$ is a parameter to normalize the relative strength of smoothing with respect to the size of neighborhood, which reads $$\alpha_{ij} = \frac{K}{|j - i| \sum_{l \in \mathcal{N}_i} \frac{1}{|l-i|}}. \tag{27}$$

Appendix 1

$\gamma$ is a hyper-parameter for controlling the smoothing strength. We use the Mean-field approximation which assumes that $P(\{c_i\}|\{\mathbf{v}_{ki}^*\}, \mathbf{u}) \approx \prod_i P(c_i|\{\mathbf{v}_{ki}^*\}, \mathbf{u})$ again to achieve the optimal estimation. We omit the detailed derivation and only show the final result, which derives that the marginal probability of taking camera $k$ for the $i$-th frame is $$P(c_i = k | \{\mathbf{v}_{ki}^*\}, \mathbf{u}) = \langle \delta_{c_i,k} \rangle^C = \frac{\exp\left\{(1-\gamma) \sum_{j \in \mathcal{N}_i} \alpha_{ij} \langle \delta_{c_j,k} \rangle^C + \gamma \rho_{ki}\right\}}{\sum_k \exp\left\{(1-\gamma) \sum_{j \in \mathcal{N}_i} \alpha_{ij} \langle \delta_{c_j,k} \rangle^C + \gamma \rho_{ki}\right\}}, \quad (28)$$

where $\langle x \rangle^C = \sum_{\{c_i\}} x P(\{c_i\}|\{\mathbf{v}_{ki}^*\}, \mathbf{u})$ is the expectation value of a quantity $x$. The smoothing process is performed by iterating the following fixed-point rule until reaching convergence, $$\langle \delta_{c_i,k} \rangle^C = \frac{\exp\left\{(1-\gamma) \sum_{j \in \mathcal{N}_i} \alpha_{ij} \langle \delta_{c_j,k} \rangle^C + \gamma \rho_{ki}\right\}}{\sum_k \exp\left\{(1-\gamma) \sum_{j \in \mathcal{N}_i} \alpha_{ij} \langle \delta_{c_j,k} \rangle^C + \gamma \rho_{ki}\right\}}. \quad (29)$$

After convergence, we select the camera which maximizes $\langle \delta_{c_i,k} \rangle^C$, i.e., $$c_i^* = \arg\max_{c_i} \langle \delta_{c_i,k} \rangle^C. \quad (30)$$

3. Experimental Results and Discussions

We organized a data-acquisition in the city of Namur, Belgium, under real game environment, where seven cameras were used to record four games. All those videos are publicly distributed in the website of APIDIS project [1] and more detailed explanation about the acquisition settings could be found in Ref.[14]. Briefly, those cameras are all Arecont Vision AV2100M IP cameras, whose positions in the basketball court are shown in Fig.6. The fish-eye lenses used for the top view cameras are Fujinon FE185C086HA-1 lenses. Frames from seven cameras were all sent to a server, where the arrival time of each frame was used in synchronizing different cameras. In Fig.7, samples images from all the seven cameras are given. Due to the limited number of

Appendix 1 cameras, we set most of the cameras to cover the left court. As a result, we will mainly focus on the left court to investigate the performance of our system in personalized production of sports videos.

Since video production still lacks an objective rule for performance evaluation. Many parameters are heuristically determined based on subjective evaluation. We defined several salient objects and relationship between object type and interest is given in Table 1. If the user shows special interests on one salient object, the weight will be multiplied by a factor 1.2. For viewpoint smoothing, we set all $\beta_{ki}$ to 1 for camera-wise viewpoint smoothing in the following experiments. We also let $\sigma_{1x} = \sigma_{1y} = \sigma_{1w} = \sigma_1$ and $\sigma_{2x} = \sigma_{2y} = \sigma_{2w} = \sigma_2$.

A short video clip with about 1200 frames is used to demonstrate behavioral characteristics of our system, especially its adaptivity under limited Appendix 1

Table 1: Weighting of Different Salient Objects

| Object type | Ball | Player | Judge | Basket | Coach-bench | Others |
|---|---|---|---|---|---|---|
| $\mathcal{I}(o_{kim}|u)$ | 2 | 1 | 0.8 | 0.6 | 0.4 | 0.2 | display resolution. This clip covers three ball-possession periods and includes five events in total. In Fig.8, we show time spans of all events, whose most highlighted moments are also marked out by red solid lines. In the final version of this project, meta-data should be generated by automatic understanding of the scene. In the present paper which focuses on personalized production, we first evaluate our methods on manually collected meta-data. We will explore the efficiency of each individual processing step of our method, and then make an overall evaluation based on finally generated outputs. Due to the page limitation, numerical results are given and depicted by graphs in the present paper while their corresponding videos are only available in the website of APIDIS project.[1] Reviewers are invited to download video samples produced based on different user preferences to subjectively evaluate the efficiency and relevance of the proposed approach.

We start from investigating the performance of our method for individual selection of viewpoints. Camera-wise sequences of automatically determined viewpoints by our method are put into a table in Fig.9, where widths of optimal viewpoints under three different display resolutions, i.e., 160x120, 320x240, and 640x480 are displayed for all the seven cameras. Weak viewpoint smoothing has been applied to improve the readability of generated videos, where the smoothing strength is set to $\sigma_2/\sigma_1 = 4$. From comparison of results under three different display resolutions, the most obvious finding is that a higher display resolution leads to a larger viewpoint width while a lower display resolution prefers a smaller viewpoint size, just as we have Appendix 1 expected from our selection criterion. Since camera 1, 6, and 7 only cover half the court, their sizes of viewpoints will be fixed when all players are in the other half court, which explains the flat segments in their corresponding sub-graphs. From the video data, we could further confirm that even when the display resolution is very low, our system will extract a viewpoint of a reasonable size where the ball is scaled to a visible size. Although in some frames only the ball is displayed for the lowest display resolution, it will not cause a problem because those frames will be filtered out by post camera selection.

Viewpoint sizes of smoothed sequences under different smoothing strengths are compared in Fig.10(a). With all other parameters being the same, the ratio of $\sigma_2$ to $\sigma_1$ is tuned for all the five cases. A higher ratio of $\sigma_2$ to $\sigma_1$ corresponds to a stronger smoothing process while a smaller ratio means weaker smoothing. When $\sigma_2/\sigma_1 = 1$ where very weak smoothing is applied, we obtain a quite accidented sequence, which results in a flickering video with a lot of dramatic viewpoint movements. With the increasing of $\sigma_2/\sigma_1$ ratio, the curve of viewpoint movement becomes to have less sharp peaks, which provides perceptually more comfortable contents. Another important observation is that generated sequences will be quite different from our initial selection based on saliency information, if too strong smoothing has been performed with a very large $\sigma_2/\sigma_1$. This will cause such problems as the favorite player or the ball is out of the smoothed viewpoint. Ratio $\sigma_2/\sigma_1$ should be determined by considering the trade-off between locally optimized viewpoints and globally smoothed viewpoint sequences. By visually checking the generated videos, we consider that results with a weak smoothing such

Appendix 1 as $\sigma_2/\sigma_1 = 4$ are already perceptually acceptable by viewing the demo video.

We then verify our smoothing algorithm for camera sequence. Smoothed camera sequences under various smoothing strength $\gamma$ are depicted in Fig.10(b). The smoothing process takes the probability defined in Eq.11 as initial values, and iterates the fixed-point updating rule with a neighborhood of size thirty until convergence. A camera sequence without smoothing corresponds to the topmost sub-graph in Fig.10(b), while the sequence with the strongest smoothing is plotted in the bottom sub-graph. It is clear that there are many dramatic camera switches in an unsmoothed sequence, which leads to even more annoying visual artifacts than fluctuated viewpoint position, as we can see from the generated videos. Therefore, we prefer strong smoothing on camera sequences and will use $\gamma = 0.8$ in following experiments.

In Fig.11 (a) and (b), we compare viewpoints and cameras in generated sequences with respect to different display resolutions, respectively. From top to bottom, we show results for display resolution $u^{DEV} = 160, 320$, and $640$ in three sub-graphs. When the same camera is selected, we observe that a larger viewpoint is preferred by a higher display resolution. When different cameras are selected, we need to consider both the position of selected camera and the position of determined viewpoint in evaluating the coverage of output scene. Again, we confirm that sizes of viewpoints increase when display resolution becomes larger. Before the 400-th frame, the event occurs in the right court. We find that the 3-rd camera, i.e., the top-view with wide-angle lens, appears more often in the sequence of $u^{DEV} = 640$ than that of $u^{DEV} = 160$ and their viewpoints are also broader, which proves that a larger resolution prefers a wider view. Although the 2-nd camera appears quite often in $u^{DEV} = 160$, its corresponding viewpoints are much smaller in width. This camera is selected because it provides a side view of the right court with salient object gathered closer than other camera views due to projective geometry. For the same reason, the 3-rd camera appears more often in $u^{DEV} = 160$ when the game moves to the left court from the 450-th frame to the 950-th frame. This conclusion is further confirmed by thumbnails in Fig.12, where frames from index 100 to 900 are arranged into a table for the above three display resolutions.

Due to the fact that different cameras were selected, viewpoints determined under $u^{DEV} = 640$ seem to be closer than those under $u^{DEV} = 320$ in the last five columns of Fig.12. This reflects the inconsistency of relative importance between completeness and closeness in viewpoint selection.

Appendix 1

Since only centeral points of salient objects are calculated in the criteria for viewpoint selection, result viewpoints are not continuous under different resolution. Although camera-7 is similar to camera-1 with linear zooming in, their optimal viewpoints might have different emphases on completeness and closeness. This consistency also exists in separated selection of cameras and viewpoints. If viewpoint selection focuses more on closeness and camera selection focuses more on completeness, a small cropping area on camera-7 will be first selected in viewpoint selection for $u^{DEV} = 320$, and then be rejected in the following camera selection due to insufficient completeness. Subjective test will help us to tune the relative weighting of completeness and closeness. It is more important to implement simultaneous selection of viewpoints and cameras, which requires both inclusion of positional information of cameras such as using homography, and an analytically solvable criterion for viewpoint selection. These issues are our major work in the near future.

Appendix 1

In all above experiments, no narrative user-preferences are included. If the user has special interests on a certain camera view, we could assign a higher weighting $w_k(u)$ to the specified camera. In our case, we set $w_k(u) = 1.0$ for not-specified cameras and $w_k(u) = 1.2$ for a user-specified camera. We compare the camera sequences under different preferences in Fig.13. As we can easily see from the graph, a camera appears more times when it is specified, which reflects the user preference on camera views. As for user preference on teams or players, the difference between viewpoints with and without user-preferences is difficult to tell without a well-defined evaluation rule, because all players are always cluttered together during the game. In fact, we are more interested in reflecting user-preferences on players or teams by extracting their relative frames. We thus omit the results on player or team selection, but explore them later along with results from our future work on video summarization.

4. Concluding Remarks

An autonomous system for producing personalized videos from multiple camera views has been proposed. We discussed automatic adaptation of viewpoints with respect to display resolution and scenario contents, data fusion within multiple camera views, and smoothness of viewpoint and camera sequences for fluent story telling. There are four major advantages of our methods: 1) Semantic oriented. Rather than using low-features such as edges or appearance of frames, our production is based on semantic understanding of the scenario, which could deal with more complex semantic user preference. 2) Computationally efficient. We take a divide-and-conquer strategy and consider a hierarchical processing, which is efficient in dealing with long video contents because its overall time is almost linearly proportional to the number of events included. 3) Genericity. Since our sub-methods in each individual steps are all independent from the definition of salient objects and interests, this framework is not limited to basketball videos, but able to be applied to other controlled scenarios. 4) Unsupervised. Although there are some parameters left to set by users, the system is unsupervised.

Appendix 2

The methods presented in this paper aim at detecting and recognizing players on a sport-field, based on a distributed set of loosely synchronized cameras. Detection assumes player verticality, and sums the cumulative projection of the multiple views' foreground activity masks on a set of planes that are parallel to the ground plane. After summation, large projection values indicate the position of the player on the ground plane. This position is used as an anchor for the player bounding box projected in each one of the views. Within this bounding box, the regions provided by mean-shift segmentation are sorted out based on contextual features, e.g. relative size and position, to select the ones that are likely to correspond to a digit. Normalization and classification of the selected regions then provides the number and identity of the player. Since the player number can only be read when it faces towards the camera, graph-based tracking is considered to propagate the identity of a player along its trajectory.

I. INTRODUCTION

In today's society, content production and content consumption are confronted with a fundamental mutation. Two complementary trends are observed. On the one hand, individuals become more and more heterogeneous in the way they access the content. They want to access dedicated content through a personalized service, able to provide what they are interested in, when they want it and through the communication channel of their choice. On the other hand, individuals and organizations get easier access to the technical facilities required to be involved in the content creation and diffusion process.

In this paper, we describe video analysis tools that participate to the future evolutions of the content production industry towards automated infrastructures allowing content to be produced, stored, and accessed at low cost and in a personalized and dedicated manner. More specifically, our targeted application considers the autonomous and personalized summarization of sport events, without the need for costly handmade processes. In the application scenario supported by the provided dataset, the acquisition sensors cover a basket-ball court. Distributed analysis and interpretation of the scene is then exploited to decide what to show about an event, and how to show it, so as to produce a video composed of a valuable subset from the streams provided by each individual camera. In particular, the position of the players provides the required input to drive the autonomous selection of viewpoint parameters[5], whilst identification and tracking of the detected players supports personalization of Part of this work has been funded by the FP7 European project APIDIS, and by the Belgian NSF.

the summary, e.g. through highlight and/or replay of preferred player's actions[4].

II. SYSTEM OVERVIEW

To demonstrate the concept of autonomous and personalized production, the European FP7 APIDIS research project (www.apidis.org) has deployed a multi-camera acquisition system around a basket-ball court. The acquisition setting consists in a set of 7 calibrated IP cameras, each one collecting 2 Mpixels frames at a rate higher than 20 frames/sec. After an approximate temporal synchronization of the video streams, this paper investigates how to augment the video dataset based on the detection, tracking, and recognition of players.

Figure 1 surveys our proposed approach to compute and label players tracks. After joint multiview detection of people standing on the ground field at each time instant, a graph-based tracking algorithm matches positions that are sufficiently close -in position and appearance- between successive frames, thereby defining a set of potentially interrupted disjoint tracks, also named partial tracks. In parallel, as depicted in Figure 5, image analysis and classification is considered for each frame of each view, to recognize the digits that potentially appear on the shirts of detected objects. This information is then aggregated over time to label the partial tracks.

The major contributions of this paper have to be found in the proposed people detection solution, which is depicted in Figure 2. In short, the detection process follows a bottom-up approach to extract denser clusters in a ground plane occupancy map that is computed based on the projection of foreground activity masks. Two fundamental improvements are proposed compared to the state-of-the art. First, the foreground activity mask is not only projected on the ground plane, as recommended in [9], but on a set of planes that are parallel to the ground. Second, an original heuristic is implemented to handle occlusions, and alleviate the false detections occurring at the intersection of the masks projected from distinct players'silhouettes by distinct views. Our simulations demonstrate that those two contributions quite significantly improve the detection performance.

The rest of the paper is organized as follows. Sections III, V, and IV respectively focus on the detection, tracking, and recognition problems. Experimental results are presented in Section VI to validate our approach. Section VII concludes.

Appendix 2

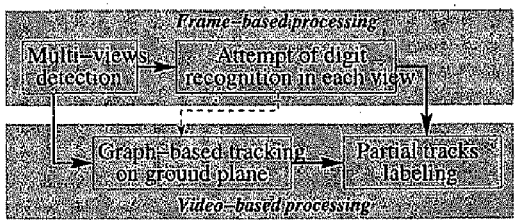

Fig. 1. Players tracks computation and labeling pipeline. The dashed arrow reflects the optional inclusion of the digit recognition results within the appearance model considered for tracking.

III. MULTI-VIEW PEOPLE DETECTION

Keeping track of people who occlude each other using a set of $C$ widely spaced, calibrated, stationary, and (loosely) synchronized cameras is an important question because this kind of setup is common to applications ranging from (sport) event reporting to surveillance in public space. In this section, we consider a change detection approach to infer the position of players on the ground field, at each time instant.

A. Related work

Detection of people from the foreground activity masks computed in multiple views has been investigated in details in the past few years. We differentiate two classes of approaches.

On the one hand, the authors in [9], [10] adopt a bottom-up approach, and project the points of the foreground likelihood (background subtracted silhouettes) of each view to the ground plane. Specifically, the change probability maps computed in each view are warped to the ground plane based on homographies that have been inferred off-line. The projected maps are then multiplied together and thresholded to define the patches of the ground plane for which the appearance has changed compared to the background model and according to the single-view change detection algorithm.

On the other hand, the works in [2], [7], [1] adopt a top-down approach. They consider a grid of points on the ground plane, and estimate the probabilities of occupancy of each point in the grid based on the back-projection of some kind of generative model in each one of the calibrated multiple views. Hence, they all start from the ground plane, and validate occupancy hypothesis based on associated appearance model in each one of the views. The approaches proposed in this second category mainly differ based on the kind of generative model they consider (rectangle or learned dictionary), and on the way they decide about occupancy in each point of the grid (combination of multiple view-based classifiers in [2], probabilistic occupancy grid inferred from background subtraction masks in [7], and sparsity constrained binary occupancy map for [1]).

The first category of methods has the advantage to be computationally efficient, since the decision about ground plane occupancy is directly taken from the observation of the projection of the change detection masks of the different

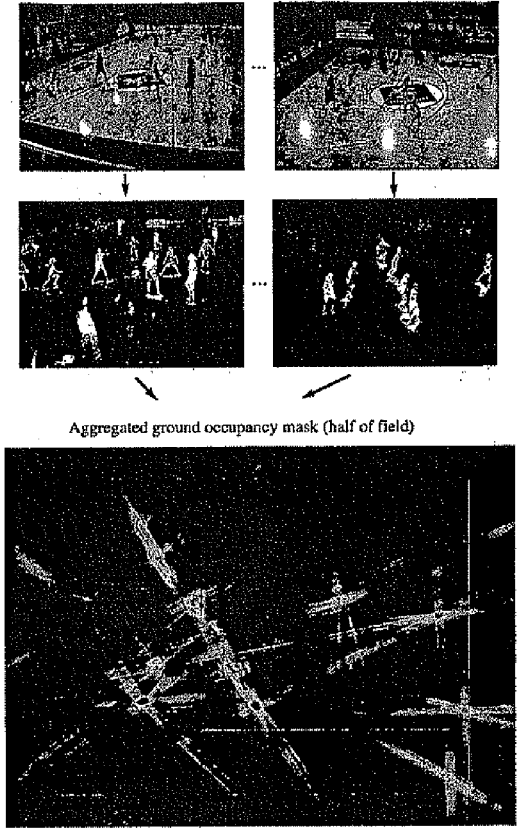

Fig. 2. Multi-view people detection. Foreground masks are projected on a set of planes that are parallel to the ground plane to define a ground plane occupancy map, from which players' position is directly inferred.

views. In contrast, the complexity of the second category of algorithms depends on the number of ground plane points to be investigated (chosen to limit the area to be monitored), and on the computational load associated to the validation of each occupancy hypothesis. This validation process generally involves back-projection of a 3D-world template in each one of the views. With that respect, we note that, due to lens and projection distortions, even the warping of simple 3D rectangular template generally results in non-rectangular patterns in each one of the views, thereby preventing the use of computationally efficient integral images techniques. Hence, in most practical cases, the second kind of approach is significantly more complex than the first one. In return, it offers increased performance since not only the feet, but the entire object silhouette is considered to make a decision.

Our approach is an attempt to take the best out of both categories. It proposes a computationally efficient bottom-up

Appendix 2 approach that is able to exploit the entire a priori knowledge we have about the object silhouette. Specifically, the bottom-up computation of the ground occupancy mask described in Section III-B exploits the fact that the basis of the silhouette lies on the ground plane (similarly to previous bottom-up solutions), but also that the silhouette is a roughly rectangular vertical shape (which was previously reserved to top-down approaches). As a second contribution, Section III-C proposes a simple greedy heuristic to resolve the interference occurring between the silhouettes projected from distinct views by distinct objects. Our experimental results reveal that this interference was the source of many false detections while inferring the actual objects positions from the ground occupancy mask. Until now, this phenomenon had only been taken into account by the top-down approach described in [7], through a complex iterative approximation of the joint posterior probabilities of occupancy. In contrast, whilst approximate, our approach appears to be both efficient and effective.

B. Proposed approach: ground plane occupancy mask computation

Similar to [9], [10], [7], [1], our approach carries out single-view change detection independently on each view to compute a change probability map. To this purpose, a conventional background subtraction algorithm based on mixture of gaussians modeling is implemented. To fusion the resulting binary foreground silhouettes, our method projects them to build a ground occupancy mask. However, in contrast to previous bottom-up approaches [9], [10], we do not consider projection on the ground plane only, but on a set of planes that are parallel to the ground plane, and cut the object to detect at different heights. Under the assumption that the object of interest stands roughly vertically, the cumulative projection of all those projections on a virtual top view plane actually reflects ground plane occupancy. This section explains how the mask associated to each view is computed. The next section investigates how to merge the information provided by the multiple views to detect people.

Formally, the computation of the ground occupancy mask $G_i$ associated to the $i^{th}$ view is described as follows. At a given time, the $i^{th}$ view is the source of a binary background subtracted silhouette image $B_i \in \{0,1\}^{M_i}$, where $M_i$ is the number of pixels of camera $i$, $1 \leq i \leq C$. As explained above, $B_i$ is projected on a set of $L$ reference planes that are defined to be parallel to the ground plane, at regular height intervals, and up to the typical height of a player. Hence, for each view $i$, we define $G_i^j$ to be the projection of the $i^{th}$ binary mask on the $j^{th}$ plane. $G_i^j$ is computed by applying the homography warping each pixel from camera $i$ to its corresponding position on the $j^{th}$ reference plane, with $0 \leq j < L$. By construction, points from $B_i$ that are labeled to 1 because of the presence of a player in the $j^{th}$ reference plane project to corresponding top view position in $G_i^j$. Hence, the summation $G_i$ of the projections obtained at different heights and from different views is expected to highlight top view positions of vertically standing players.

As $L$ increases, the computation of $G_i$ in a ground position x tends towards the integration of the projection of $B_i$ on a vertical segment anchored in x. This integration can equivalently be computed in $B_i$, along the back-projection of the vertical segment. To further speed up the computations, we observe that, through appropriate transformation of $B_i$, it is possible to shape the back-projected integration domains so that they correspond to segments of vertical lines in the transformed view, thereby making the computation of integrals particularly efficient through the principle of integral images. Figure 3 illustrates that specific transformation for one particular view. The transformation has been designed to address a double objective. First, points of the 3D space located on the same vertical line have to be projected on the same column in the transformed view (vertical vanishing point at infinity). Second, vertical objects that stand on the ground and whose feet are projected on the same horizontal line of the transformed view have to keep same projected heights ratios.

Once the first property is met, the 3D points belonging to the vertical line standing above a given point from the ground plane simply project on the column of the transformed view that stands above the projection of the 3D ground plane point. Hence, $G_i(x)$ is simply computed as the integral of the transformed view over this vertical back-projected segment. Preservation of height along the lines of the transformed view even further simplifies computations.

For side views, these two properties can be achieved by virtually moving -through homography transforms- the camera viewing direction (principal axis) so as to bring the vertical vanishing point at infinity and ensure horizon line is horizontal. For top views, the principal axis is set perpendicular to the ground and a polar mapping is performed to achieve the same properties. Note that in some geometrical configurations, these transformations can induces severe skewing of the views.

C. Proposed approach: people detection from ground occupancy

Given the ground occupancy masks $G_i$ for all views, we now explain how to infer the position of the people standing on the ground. A priori, we know that (i) each player induces a dense cluster on the sum of ground occupancy masks, and (ii) the number of people to detect is equal to a known value K, e.g. $K = 12$ for basket-ball (players + referees).

For this reason, in each ground location x, we consider the sum of all projections -normalized by the number of views that actually cover x-, and look for the higher intensity spots in this aggregated ground occupancy mask (see Figure 2 for an example of aggregated ground occupancy mask). To locate those spots, we have first considered a naïve greedy approach that is equivalent to an iterative matching pursuit procedure. At each step the matching pursuit process maximizes the inner product between a translated Gaussian kernel, and the aggregated ground occupancy mask. The position of the kernel which induces the larger inner-product defines the player position. Before running the next iteration, the contribution of the Gaussian kernel is subtracted from the aggregated mask to

Appendix 2

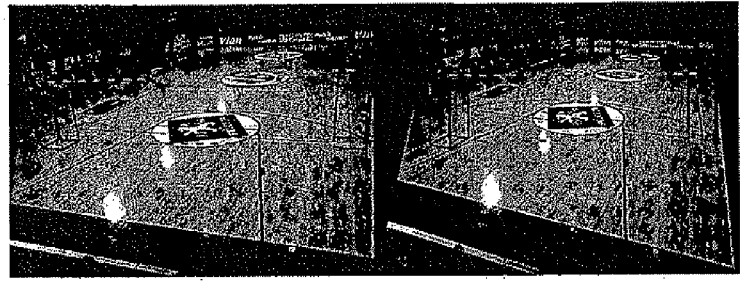

Fig. 3. Efficient computation of the ground occupancy mask: the original view (on the left) is mapped to a plane through a combination of homographies that are chosen so that (1) verticality is preserved during projection from 3D scene to transformed view, and (2) ratio of heights between 3D scene and projected view is preserved for objects that lies on the same line in the transformed view.

produce a residual mask. The process iterates until sufficient players have been found.

This approach is simple, but suffers from many false detections at the intersection of the projections of distinct players silhouettes from different views. This is due to the fact that occlusions induce non-linearities[1] in the definition of the ground occupancy mask. Hence, once some people are known to be present on the ground field affect the information that can be retrieved from the binary change masks in each views. In particular, if the vertical line associated to a position x is occluded by/occludes another player whose presence is very likely, this particular view should not be exploited to decide whether there is a player in x or not.

For this reason, we propose to refine our naive approach as follows.

To initialize the process, we define $G_i^0(x)$ to be the ground occupancy mask $G_i$ associated to the $i^{th}$ view (see Section III-B), and set $w_i^0(x)$ to 1 when x is covered by the $i^{th}$ view, and to 0 otherwise. Each iteration is then run in two steps. At iteration n, the first step searches for the most likely position of the $n^{th}$ player, knowing the position of the $(n-1)$ players located in previous iterations. The second step updates the ground occupancy masks of all views to remove the contribution of the newly located player.

Formally, the first step of iteration n aggregates the ground occupancy mask from all views, and then searches for the denser cluster in this mask. Hence, it computes the aggregated mask $G^n$ at iteration n as $$G^n(x) = \frac{\sum_{i=1}^{C} w_i^n(x) G_i^n(x)}{\sum_{i=1}^{C} w_i^n(x)}, \quad (1)$$

and then defines the most likely position $x_n$ for the $n^{th}$ player by $$x_n = \underset{y}{\operatorname{argmax}} < G^n(x), k(y) >, \quad (2)$$

where $k(y)$ denotes a Gaussian kernel centered in y and whose spatial support corresponds to the typical width of a player.

[1] In other words, the ground occupancy mask of a group of players is not equal to the sum of ground occupancy masks projected by each individual player.

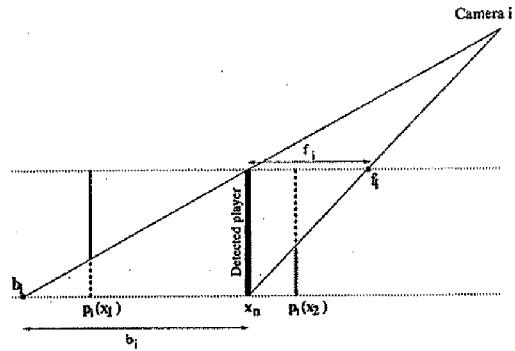

Fig. 4. Impact of occlusions on the update of ground occupancy mask associated to camera i. Dashed part of the vertical silhouette standing in $p_i(x_1)$ and $p_i(x_2)$ are known to be labeled as foreground since a player is known to be standing in $x_n$. Hence they become useless to infer whether a player is located in $x_1$ and $x_2$, respectively.

In the second step, the ground occupancy mask of each view is updated to account for the presence of the $n^{th}$ player. In the ground position x, we consider that typical support of a player silhouette in view i is a rectangular box of width W and height H, and observe that the part of the silhouette that occludes or is occluded by the newly detected player does not bring any information about the potential presence of a player in position x. Let $\alpha_i(x, x_n)$ denote the fraction of the silhouette in ground position x that becomes non-informative in view i as a consequence of the presence of a player in $x_n$. To estimate this ratio, we consider the geometry of the problem. Figure 4 depicts a plane $\mathcal{P}_i$ that is orthogonal to the ground, while passing through the $i^{th}$ camera and the player position $x_n$. In $\mathcal{P}_i$, we consider two points of interest, namely $b_l$ and $f_l$, which correspond to the points at which the rays, originated in the $i^{th}$ camera and passing through the head and feet of the player, intersect the ground plane and the plane parallel to ground at height H, respectively. We denote $f_i$ ($b_i$) to be the distance between $f_l$ ($b_l$) and the vertical line supporting player n in $\mathcal{P}_i$. We also consider $p_i(x)$ to denote

Appendix 2 the orthogonal projection of x on $\mathcal{P}_i$, and let $d_i(x)$ measure the distance between x and $\mathcal{P}_i$. Based on those definitions, the ratio $\alpha_i(x, x_n)$ is estimated by $$\alpha_i(x, x_n) = [(\delta - \min(\|p_i(x) - x_n\|, \delta))/\delta]$$
$$\cdot [1 - \min(d_i(x)/W, 1)] \quad (3)$$

with $\delta$ being equal to $f_i$ or $b_i$, depending on whether $p_i(x)$ lies ahead or behind $x_n$, with respect to the camera. In (3), the first and second factors reflect the misalignment of x and $x_n$ in $\mathcal{P}_i$ and orthogonally to $\mathcal{P}_i$, respectively.

Given $\alpha_i(x, x_n)$, the ground occupancy mask and aggregation weight of the $i^{th}$ camera in position x are updated as follows:

$$G_i^{n+1}(x) = \max(G_i^n(x) - \alpha_i(x, x_n) G_i^0(x_n), 0) \quad (4)$$

$$w_i^{n+1}(x) = \max(w_i^n(x) - \alpha_i(x, x_n)) \quad (5)$$

For improved computational efficiency, we limit the positions x investigated in the refined approach to the 30 local maxima that have been detected by the naive approach.

For completeness, we note that the above described update procedure omit the potential interference between occlusions caused by distinct players in the same view. However, the consequence of this approximation is far from being dramatic, since it ends up in, without affecting the information that is actually exploited. Taking those interferences into account would require to back-project the player silhouettes in each view, thereby tending towards a computationally and memory expensive top-down approach such as the one presented in [7].

Moreover, it is worth mentioning that, in a top-down context, the authors in [1] or in [7] propose formulations that simultaneously search for the K positions that best explain the multiple foreground masks observations. However, jointly considering all positions increases the dimensionality of the problem, and dramatically impact the computational load. Since our experimental results show that our proposed method does not suffer from the usual weaknesses of greedy algorithms, such as a tendency to get caught in bad local minima, we believe that it compares very favorably to any joint formulation of the problem, typically solved based on iterative proximal optimization techniques.

IV. PLAYERS DIGIT RECOGNITION

This section considers the recognition of the digital characters printed on the sport shirts of athletes. The proposed approach is depicted in Figure 2. For each detected position on the ground plane, a 0.8m × 2m conservative bounding box is projected in each one of the views. Each box is then processed according to an approach that is similar to the coarse-to-fine method introduced in [12]. In the initial step, the bounding box image is segmented into regions. Digit candidate regions are then filtered out based on contextual attributes. Eventually, selected regions are classified into '0-9' digits or bin classes, and the identity of the player is defined by majority vote, based on the results obtained in different views. Our proposed

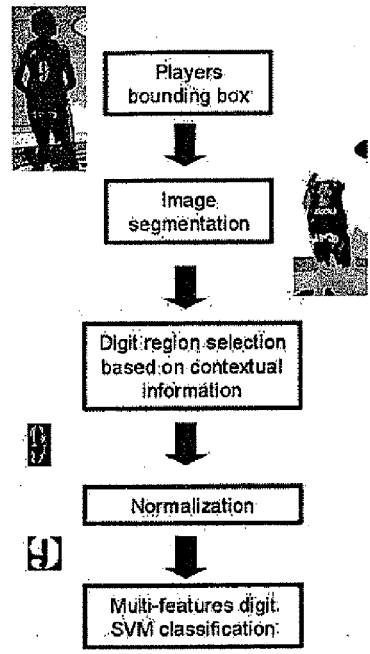

Fig. 5. Recognition of digits printed on players' shirts through segmentation, selection, and classification of regions that are likely to represent digits.

approach differs from [12] in the way each one of those steps is implemented.

Our segmentation step is based on the mean-shift algorithm [6], which is a pattern recognition technique that is particularly well suited to delineate denser regions in some arbitrarily structured feature space. In the mean-shift image segmentation, the image is typically represented as a two-dimensional lattice of 3-dimensional L*u*v pixels. The space of the lattice is known as the spatial domain, while the color information corresponds to the range domain. The location and range vectors are concatenated in a joint spatial-range domain, and a multivariate kernel is defined as the product of two radially symmetric kernels in each domain, which allows for the independent definition of the bandwidth parameters $h_s$ and $h_r$ for the spatial and range domains, respectively [6]. Local maxima of the joint domain density are then computed, and modes that are closer than $h_s$ in the spatial domain and $h_r$ in the range domain are pruned into significant modes. Each pixel is then associated with a significant mode of the joint domain density located in its neighborhood. Eventually, spatial regions that contain less than $M$ pixels are eliminated. In our case, since there is a strong contrast between digit and shirt, we can afford a high value for $h_r$, which is set to 8 in our simulations. The parameter $h_s$ trade-offs the run time of segmentation and subsequent filtering and classification stages. Indeed, a small $h_r$ value defines a smaller kernel, which makes

Appendix 2 the segmentation faster but also results in a larger number of regions to process in subsequent stages. In our simulations, $h_r$ has been set to 4, while $M$ has been fixed to 20.

To filter out regions that obviously do not correspond to digits, we rely on the following observations:

- Valid digit regions never touch the border of the (conservative) bounding box;
- Valid digit regions are surrounded by a single homogeneously colored region. In practice, our algorithm selects the regions for which the neighbors of the 4 extreme (top/bottom, right/left) points of the region belong to the same region;
- The height and width of valid regions ranges between two values that are defined relatively to the bounding box size. Since the size of the bounding is defined according to real-world metrics, the size criterion implicitly adapts the range of height and width values to the perspective effect resulting from the distance between the detected object and the camera.

For completeness, it is worth mentioning that some particular fonts split some digits in two distinct regions. For this reason, candidate digit regions are composed of either a single or a pair of regions that fulfill the above criteria.

The (pairs of) regions that have been selected as eligible for subsequent processing are then normalized and classified. Normalization implies horizontal alignment of the major principal axis, as derived through computation of moments of inertia, and conversion to a $24 \times 24$ binary mask. Classification is based on the 'one-against-one' multi-class SVM strategy [8], as recommended and implemented by the LIBSVM library [3]. A two-class SVM is trained for each pair of classes, and a majority vote strategy is exploited to infer the class (0 to 9 digit or bin class) from the set of binary classification decisions. In practice, to feed the classifier each region sample is described by a 30-dimensional feature vector, namely:

- 1 value to define the number of holes in the region;
- 3 values corresponding to second order moments m02, m20, and m22;
- 2 values to define the center of mass of the region;
- $2 \times 12$ values to define the histogram of the region along vertical and horizontal axis.

Numbers with two digits are reconstructed based on the detection of two adjacent digits. To run our simulations, we have trained the SVM classifier based on more than 200 manually segmented samples of each digit, and on 1200 samples of the bin class. The bin class samples correspond to non-digit regions that are automatically segmented in one of the views, and whose size is consistent with the one of a digit.

V. DETECTED PLAYERS TRACKING

To track detected players, we have implemented a rudimentary whilst effective algorithm. The tracks propagation is currently done over a 1-frame horizon, based on the Munkres general assignment algorithm[11]. Gating is used to prevent unlikely matches, and a high level analysis module is used to link together partial tracks using shirt color estimation. In the future, graph matching techniques should be used to evaluate longer horizon matching hypothesis. More sophisticated high level analysis should also be implemented, e.g. to exploit the available player recognition information or to duplicate the partial tracks that follow two players that are very close to each other.

VI. EXPERIMENTAL VALIDATION

A. Player detection and tracking

To evaluate our player detection algorithm, we have measured the average missed detection and false detection rates over 180 different and regularly spaced time instants in the interval from 18:47:00 to 18:50:00, which corresponds to a temporal segment for which a manual ground truth is available. This ground truth information consists in the positions of players and referees in the coordinate reference system of the court. We consider that two objects cannot be matched if the measured distance on the ground is larger than 30 cm. Figure 6 presents several ROC curves, each curve being obtained by varying the detection threshold for a given detection method. Three methods are compared, and for each of them we assess our proposed algorithm to mitigate false detections. As a first and reference method, we consider the approach followed by [9], [10], which projects the foreground masks of all views only on the ground plane. The poor performance of this latter approach is mainly due to the shadows of the players, and to the small contribution of players' feet to the foreground masks. To validate this interpretation, in the second method, we have projected the foreground masks on a single plane located one meter above the ground plane. Doing this, the shadows influence is drastically attenuated, whilst the main contribution now originates from the body center parts, which are usually well represented in the foreground masks. We observe significant improvements compared to [9], [10]. The third and last detection method presented in Figure 6 is our proposed method. We observe that the benefit obtained from our ground occupancy integration is striking. The improvement brought by our false alarm detector is also quite obvious. In addition, the cross in Figure 6 presents an operating point achieved after rudimentary tracking of detected positions. We observe that taking into account temporal consistency can still further improve the detection results.

In the APIDIS setup, all areas of the basket court are not covered by the same number of cameras. Figure 7 shows the influence of the camera coverage on the missed and false detections rates. It also shows that in the areas with high coverage, most of the missed detections are due to players standing very close one to another.

B. Player recognition

To validate the player recognition pipeline, we have selected 190 bounding boxes of players from side views cameras. In each selected bounding box, the digit was visible and could be read by a human viewer, despite possibly significant

Appendix 2

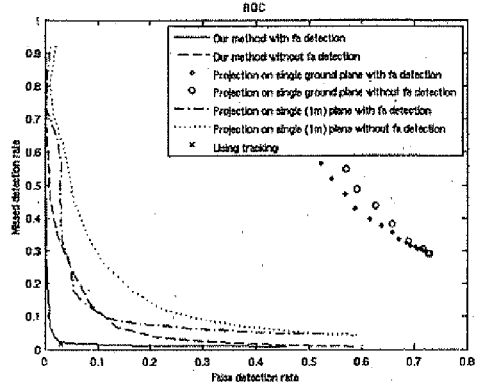

Fig. 6. ROC analysis of player detection performance.

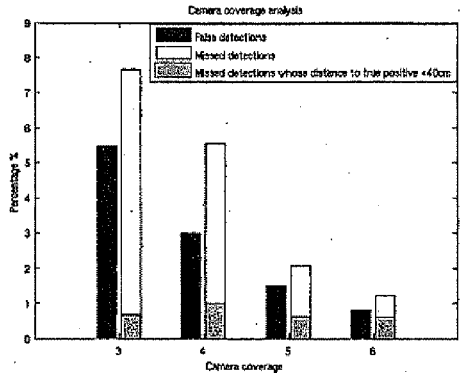

Fig. 7. Player detection performance wrt camera coverage.

appearance distortions. Table I summarizes our recognition results. The recognition rate is above 73%. More interestingly, we observe that when the digit was not recognized, it was most often assigned to the bin class, or did not pass the contextual analysis due to segmentation error. Moreover, the remaining 4% of false positive do not include any real mismatch between two digits. Actually, 75% of false positives were due to the miss of one digit in a two-digits number. In other cases, two digits have been recognized, the correct one and a false detected one.

Besides, a more detailed analysis has revealed that most of the non-recognized players were standing on the opposite side of the field, compared to the camera view from which the bounding box was extracted. In this case, the the height of the digit decreases to less than 15 pixels, which explains the poor recognition performance, below 50%. In contrast, a camera located on the same side of the field than the player achieves close to 90% correct recognition rate.

Based on those observations, we are reasonably confident that the recognition performance of our system will be sufficiently good to assign a correct label to short segments of player trajectories, thereby providing a valuable tool both to raise tracking ambiguities or to favor a preferred player during video summary production.

| Recognition | 73 % |
|---|---|
| Segmentation error | 11 % |
| False negative | 12 % |
| False positive | 4 % |

TABLE I
PLAYER RECOGNITION PERFORMANCE.

VII. CONCLUSION

We have presented video processing algorithms to define the position and identity of athletes playing on a sport field, surrounded by a set of loosely synchronized cameras. Detection relies on the definition of a ground occupancy map, while player recognition builds on pre-filtering of segmented regions and on multi-class SVM classification. Experiments on the APIDIS real-life dataset demonstrate the relevance of the proposed approaches.

REFERENCES

[1] A. Alahi, Y. Boursier, L. Jacques, and P. Vandergheynst, "A sparsity constrained inverse problem to locate people in a network of cameras," in *Proceedings of the 16th International Conference on Digital Signal Processing (DSP)*, Santorini, Greece, July 2006.

[2] J. Berclaz, F. Fleuret, and P. Fua, "Principled detection-by-classification from multiple views," in *Proceedings of the International Conference on Computer Vision Theory and Application (VISAPP)*, vol. 2, Funchal, Madeira, Portugal, January 2008, pp. 375–382.

[3] C.-C. Chang and C.-J. Lin, "LIBSVM: A library for support vector machines," in http://www.csie.ntu.edu.tw/cjlin/papers/libsvm.pdf.

[4] F. Chen and C. De Vleeschouwer, "A resource allocation framework for summarizing team-sport videos," in *IEEE International Conference on Image Processing*, Cairo, Egypt, November 2009.

[5] ——, "Autonomous production of basket-ball videos from multi-sensored data with personalized viewpoints," in *Proceedings of the 10th International Workshop on Image Analysis for Multimedia Interactive Services*, London, UK, May 2009.

[6] D. Comaniciu and P. Meer, "Mean shift: a robust approach toward feature space analysis," *IEEE Transactions on Pattern Analysis and Machine Intelligence*, vol. 24, no. 5, pp. 603–619, May 2002.

[7] F. Fleuret, J. Berclaz, R. Lengagne, and P. Fua, "Multi-camera people tracking with a probabilistic occupancy map," *IEEE Transactions on Pattern Analysis and Machine Intelligence*, vol. 30, no. 2, pp. 267–282, February 2008.

[8] C.-W. Hsu and C.-J. Lin, "A comparison of methods for multiclass support vector machines," *IEEE Transactions on Neural Networks*, vol. 13, no. 2, pp. 415–425, March 2002.

[9] S. Khan and M. Shah, "A multiview approach to tracing people in crowded scenes using a planar homography constraint," in *Proceedings of the 9th European Conference on Computer Vision (ECCV)*, vol. 4, Graz, Austria, May 2006, pp. 133–146.

[10] A. Lanza, L. Di Stefano, J. Berclaz, F. Fleuret, and P. Fua, "Robust multiview change detection," in *British Machine Vision Conference (BMVC)*, Warwick, UK, September 2007.

[11] J. Munkres, "Algorithms for the assignment and transportation problems," in *SIAM J. Control*, vol. 5, 1957, pp. 32–38.

[12] Q. Ye, Q. Huang, S. Jiang, Y. Liu, and W. Gao, "Jersey number detection in sports video for athlete identification," in *Proceedings of the SPIE, Visual Communications and Image Processing*, vol. 5960, Beijing, China, July 2005, pp. 1599–1606.

The invention claimed is:

1. A computer based camerawork method for autonomous production of an edited video from multiple video streams captured by a plurality of fixed and/or motorized cameras distributed around a scene of interest, that selects, based on a known location of a set of objects-of-interest and as a function of time, sequences of optimal viewpoints to fit a display resolution and user preferences, and for smoothing these sequences of optimal viewpoints for a continuous and graceful story-telling, the camerawork method comprising:
   selecting, for each envisioned camera location and/or position, a field of view obtained by:
      either cropping an image captured by a fixed camera, thereby defining image cropping parameters, or
      selecting pan-tilt-zoom parameters for a virtual or motorized camera,
      wherein, as part of said field of view selection, objects-of-interest are included and the field of view is selected based on joint processing of the positions of the multiple objects-of-interest that have been detected, and
      wherein the selection of the field of view is done in a way that balances completeness and closeness metrics as a function of individual user preferences, wherein completeness counts a number of objects-of-interest that are included and visible within the displayed viewpoint, and closeness measures a number of pixels that are available to describe the objects-of-interest, and wherein said user preferences define a set of parameters that are used to tune the trade-off between completeness and closeness, and
   autonomously building the edited video by selecting and concatenating video segments provided by one or more individual cameras, wherein the building is done in a way that balances completeness and closeness metrics along the time, while smoothing out the sequence of said cropping and/or pan-tilt-zoom parameters associated to concatenated segments, wherein the smoothing process is implemented based on a linear or non-linear low-pass temporal filter mechanism, and the relative importance of each camera location is tuned according to user preference.

2. The method of claim 1, further comprising rating the viewpoint selected in each camera view according to the quality of its completeness/closeness trade-off, and to its degree of occlusions.

3. The method of claim 2, wherein the highest rate correspond to a view that makes most object of interest visible, and is close to the action.

4. The method of claim 1, further comprising selecting the optimal field of view in each camera, at a given time instant, wherein a field of view $v_k$ in the $k^{th}$ camera view is defined by the size $S_k$ and the center $c_k$ of the window that is cropped in the $k^{th}$ view for actual display and is selected to include the objects of interest and to provide a high resolution description of the objects, and an optimal field of view $v_k^*$ is selected to maximize a weighted sum of object interests as follows $$v_k^* = \underset{\{S_k, c_k\}}{\mathrm{argmax}} \sum_{n=1}^{N} I_n \cdot \alpha(S_k, u) \cdot m\left(\frac{\|x_{n,k} - c_k\|}{S_k}\right)$$

where, in the above equation:
   $I_n$ denotes the level of interest assigned to the $n^{th}$ object detected in the scene $x_{n,k}$ denotes the position of the $n^{th}$ object in camera view $k$ The function $m(\ldots)$ modulates the weights of the $n^{th}$ object according to its distance to the center of the viewpoint window, compared to the size of this window The vector u reflects the user preferences, in particular, its component $u_{res}$ defines the resolution of the output stream, which is generally constrained by the transmission bandwidth or end-user device resolution The function $\alpha(.)$ reflects the penalty induced by the fact that the native signal captured by the $k^{th}$ camera has to be sub-sampled once the size of the viewpoint becomes larger than the maximal resolution $u_{res}$ allowed by the user.

5. The method of claim 4, wherein $\alpha(\ldots)$ decreases with Sk and the function $\alpha(\ldots)$ is equal to one when $S_k < u_{res}$, and decrease afterwards, and
   wherein $\alpha(\ldots)$ is defined optionally by:

$$\alpha(S, u) = \left[\min\left(\frac{u_{res}}{S}, 1\right)\right]^{u_{close}},$$

where the exponent $u_{close}$ is larger than 1, and increases as the user prefers full-resolution rendering of zoom-in area, compared to large but sub-sampled viewpoints.

6. The method of claim 4, wherein selecting the camera at a given time instant that makes most object of interest visible given the interest $I_n$ of each player, wherein the rate $I_k(v_k, u)$ associated to the $k^{th}$ camera view is defined as follows:

$$I_k(v_k, u) = \sum_{n=1}^{N} I_n \cdot o_k(x_n | \bar{x}) \cdot h_k(x_n) \cdot \beta_k(S_k, u) \cdot m\left(\frac{\|x_{n,k} - c_k\|}{S_k}\right)$$

where, in the above equation:
   $I_n$ denotes the level of interest assigned to the $n^{th}$ object detected in the scene;
   $x_n$ denotes the position of the $n^{th}$ object in the 3D space;
   $o_k(x_n|x)$ measures the occlusion ratio of the $n^{th}$ object in camera view k, knowing the position of all other objects, the occlusion ratio of an object being defined to be the fraction of pixels of the object that are hidden by other objects when projected on the camera sensor;
   The height $h_k(x_n)$ is defined to be the height in pixels of the projection in view k of a reference height of a reference object located in $x_n$; The value of $h_k(x_n)$ is directly computed based on camera calibration, or when calibration is not available, it can be estimated based on the height of the object detected in view k;
   The function $\beta_k(.)$ reflects the impact of the user preferences in terms of camera view and display resolution.

7. The method of claim 6, wherein $\beta_k(.)$ is defined as $$\beta_k(S, u) = u_k \cdot \alpha(S, u)$$

where $u_k$ denotes the weight assigned to the $k^{th}$ camera, and $\alpha(S, u)$ is defined as in claim 5.

8. The method of claim 1 further comprising smoothing the sequence of camera indices and corresponding viewpoint parameters, wherein the smoothing process is for example implemented based on two Markov Random Fields, linear or non-linear low-pass filtering mechanism, or via a graph model formalism, solved based on conventional Viterbi algorithm.

9. The computer based camerawork method according to claim 1, wherein the user preferences are at least one of a user preferred device capability, a user preferred group of objects, a user preferred object, a user preferred view type, and a user preferred camera.

10. A computer based camerawork system comprising a processing engine and memory for autonomous production of an edited video from multiple video streams captured by a plurality of fixed and/or motorized cameras distributed around a scene of interest, that selects based on known location of a set of objects-of-interest and as a function of time, sequences of optimal viewpoints to fit a display resolution and user preferences, and for smoothing these sequences of optimal viewpoints for a continuous and graceful story-telling, the camerawork system comprising:
    first means for selecting, for each envisioned camera location and/or position, a field of view obtained by: either cropping an image captured by a fixed camera, thereby defining image cropping parameters, or selecting pan-tilt-zoom parameters of a virtual or motorized camera, wherein, as part of said field of view selection, objects-of-interest are included and the field of view is selected based on joint processing of the positions of the multiple objects-of-interest that have been detected, wherein the selection of the field of view is done in way that balances completeness and closeness metrics as a function of individual user preferences, wherein completeness counts the number of objects-of-interest that are included and visible within the displayed viewpoint, and closeness measures the number of pixels that are available to describe the objects-of-interest, and wherein said user preferences define a set of parameters that are used to tune the trade-off between completeness and closeness, and
    second means for autonomously selecting rendering parameters that maximize and smooth out closeness and completeness metrics by concatenating segments in the video streams provided by one or more individual cameras, wherein the building is done in a way that balances completeness and closeness metrics along the time, while smoothing out the sequence of said cropping and/or pan-tilt-zoom parameters associated to concatenated segments, wherein the smoothing process is implemented based on a linear or non-linear low-pass temporal filtering mechanism, and the relative importance of each camera location is tuned according to user preferences.

11. The system of claim 10, further comprising third means for selecting camera and image parameter variations for the camera view that render action as a function of time for a set of joint closeness and completeness metrics, the third means being optionally for selecting camera and image parameter variations is adapted to crop in the camera view of a static camera or to control the control parameters of a dynamic camera.

12. The system of claim 10 further comprising fourth means for selecting the variations of parameters that optimize the trade-off between completeness and closeness at each time instant, and for each camera view, wherein the completeness/closeness trade-off is optionally measured as a function of the user preferences.

13. The system of claim 10, further comprising means for rating the viewpoint selected in each camera view according to the quality of its completeness/closeness trade-off, and to its degree of occlusions.

14. The system of claim 13, further comprising means for computing the parameters of an optimal virtual camera that pans, zooms and switches across views to preserve high ratings of selected viewpoints while minimizing the amount of virtual camera movements, for the temporal segment at hand.

15. The system of claim 14, further comprising sixth means for selecting the camera at a given time instant that makes most object of interest visible, and is close to the action, whereby an optimal camera index k* is selected according to an equation that is similar or equivalent to:

$$k^* = \underset{\{k\}}{\operatorname{argmax}} \sum_{n=1}^{N} I_n \cdot o_k(x_n | \bar{x}) \cdot h_k(x_n) \cdot \beta_k(S_k^*, u)$$

where, in the above equation:
$I_n$ denotes the level of interest assigned to the $n^{th}$ object detected in the scene;
$x_n$ denotes the position of the $n^{th}$ object in the 3D space;
$o_k(x_n|x)$ measures the occlusion ratio of the $n^{th}$ object in camera view k, knowing the position of all other objects, the occlusion ratio of an object being defined to be the fraction of pixels of the object that are hidden by other objects when projected on the camera sensor;
The height $h_k(x_n)$ is defined to be the height in pixels of the projection in view k of a reference height of a reference object located in $x_n$; The value of $h_k(x_n)$ is directly computed based on camera calibration, or when calibration is not available, it can be estimated based on the height of the object detected in view k;
The function $\beta_k(.)$ reflects the impact of the user preferences in terms of camera view and display resolution.

16. The system of claim 13, further comprising fifth means for selecting the optimal viewpoint in each camera view, at a given time instant, wherein the fifth means for selecting the optimal viewpoint is adapted, for a viewpoint $v_k$ in the $k^{th}$ camera view is defined by the size $S_k$ and the center $c_k$ of the window that is cropped in the $k^{th}$ view for actual display and is selected to include the objects of interest and to provide a high resolution, is adapted to select a description of the objects and an optimal viewpoint $v_k^*$ to maximize a weighted sum of object interests as follows $$v_k^* = \underset{\{S_k, c_k\}}{\operatorname{argmax}} \sum_{n=1}^{N} I_n \cdot \alpha(S_k, u) \cdot m\left(\frac{\|x_{n,k} - c_k\|}{S_k}\right)$$

where, in the above equation:
$I_n$ denotes the level of interest assigned to the $n^{th}$ object detected in the scene, $x_{n,k}$ denotes the position of the $n^{th}$ object in camera view k
The function m( . . . ) modulates the weights of the $n^{th}$ object according to its distance to the center of the viewpoint window, compared to the size of this window
The vector u reflects the user preferences, in particular, its component $u_{res}$ defines the resolution of the output stream, which is generally constrained by the transmission bandwidth or end-user device resolution
The function $\alpha(.)$ reflects the penalty induced by the fact that the native signal captured by the $k^{th}$ camera has to be sub-sampled once the size of the viewpoint becomes larger than the maximal resolution $u_{res}$ allowed by the user.

17. The system of claim 16, wherein $\alpha( . . . )$ decreases with Sk and the function $\alpha( . . . )$ is equal to one when $S_k < u_{res}$, and decrease afterwards, wherein $\alpha( . . . )$ is optionally defined by:

$$\alpha(S, u) = \left[\min\left(\frac{u_{res}}{S}, 1\right)\right]^{u_{close}},$$

where the exponent $u_{close}$ is larger than 1, and increases as the user prefers full-resolution rendering of zoom-in area, compared to large but sub-sampled viewpoints.

18. The system of claim 15, wherein $\beta_k(.)$ is defined as $$\beta_k(S,u) = u_k \cdot \alpha(S,u),$$

where $u_k$ denotes the weight assigned to the $k^{th}$ camera, and $\alpha(S,u)$ is defined as in claim 17.

19. The system of claim 17 further comprising means for smoothing the sequence of camera indices and corresponding viewpoint parameters, wherein the means for smoothing is adapted to smooth based on two Markov Random Fields, by a linear or non-linear low-pass filtering mechanism, by a graph model formalism, solved based on conventional Viterbi algorithm.

20. The computer based camerawork system according to claim 10, wherein the user preferences are at least one of a user preferred device capability, a user preferred group of objects, a user preferred object, a user preferred view type, and a user preferred camera.

21. A non-transitory machine readable signal storage medium storing a computer program product that comprises code segments which when executed on a processing engine execute the method of claim 1 or implement the system according to claim 10.

* * * * *